(12) United States Patent
Yu et al.

(10) Patent No.: US 12,538,309 B2
(45) Date of Patent: Jan. 27, 2026

(54) DOWNLINK TRANSMISSION METHOD AND COMMUNICATION APPARATUS

(71) Applicant: Huawei Technologies Co., Ltd., Shenzhen (CN)

(72) Inventors: Fang Yu, Shenzhen (CN); Yan Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 209 days.

(21) Appl. No.: 18/174,245

(22) Filed: Feb. 24, 2023

(65) Prior Publication Data

US 2023/0254859 A1    Aug. 10, 2023

Related U.S. Application Data

(63) Continuation of application No. PCT/CN2021/105986, filed on Jul. 13, 2021.

(30) Foreign Application Priority Data

Aug. 27, 2020 (CN) .......................... 202010877423.7

(51) Int. Cl.
*H04W 72/1273* (2023.01)
*H04W 56/00* (2009.01)

(52) U.S. Cl.
CPC ... *H04W 72/1273* (2013.01); *H04W 56/0055* (2013.01)

(58) Field of Classification Search
CPC ......... H04W 72/1273; H04W 56/0055; H04W 72/0446; H04W 72/542; H04L 47/34; H04L 47/283; H04L 47/56
See application file for complete search history.

(56) References Cited

U.S. PATENT DOCUMENTS 6,690,683 B1 * 2/2004 Brunheroto ............. H04J 3/047
370/542
7,738,505 B2 * 6/2010 Chang ................. H04L 65/1026
370/507

(Continued)

FOREIGN PATENT DOCUMENTS

CN  108886756 A  11/2018
CN  110213007 A   9/2019

(Continued)

OTHER PUBLICATIONS

Huawei, HiSilicon, Samsung, Update to Solution #13 on how to report the list of MAC address(es), 3GPP TSG-SA WG2 Meeting #129, Dongguan, China, Oct. 15-Oct. 19, 2018, S2-1811338, 2 pages.

(Continued)

*Primary Examiner* — Hoang-Chuong Q Vu
(74) *Attorney, Agent, or Firm* — Slater Matsil, LLP

(57) ABSTRACT

This application provides a downlink transmission method. A session management network element obtains duration, namely, a first delay, between an expected moment at which a downlink service packet arrives at an access network element and an estimated moment at which the downlink service packet arrives at the access network element, the expected moment is within a first scheduling window, and a next scheduling window adjacent to the first scheduling window is a downlink scheduling window. Then, the session management network element sends the first delay to an application network element, where the first delay is used by an application server to determine a second moment at which the downlink service packet is sent, and a moment at which the downlink service packet sent at the second moment arrives at the access network element is within the first scheduling window.

17 Claims, 12 Drawing Sheets

(56) References Cited

U.S. PATENT DOCUMENTS

| | | | | |
|---|---|---|---|---|
| 8,363,681 | B2* | 1/2013 | Mueller | H04J 3/0682 370/510 |
| 8,660,001 | B2* | 2/2014 | Ko | H04L 47/629 370/232 |
| 8,699,411 | B1* | 4/2014 | Gossett | H04W 72/52 370/339 |
| 8,750,293 | B2* | 6/2014 | Holmer | H04L 1/16 370/353 |
| 10,735,120 | B1* | 8/2020 | Kantharaju | H04L 43/087 |
| 2003/0086443 | A1* | 5/2003 | Beach | H04W 52/0216 370/252 |
| 2012/0008641 | A1* | 1/2012 | Stoica | H04L 47/225 370/465 |
| 2014/0072000 | A1* | 3/2014 | Shiva | H04L 47/283 370/516 |
| 2016/0127066 | A1* | 5/2016 | Jose | H04L 47/283 370/350 |
| 2016/0286487 | A1* | 9/2016 | Sachs | H04W 52/0216 |
| 2017/0290001 | A1 | 10/2017 | Axmon et al. | |
| 2018/0295050 | A1* | 10/2018 | Lee | H04L 43/04 |
| 2019/0373592 | A1* | 12/2019 | Ji | H04B 7/063 |
| 2020/0267084 | A1 | 8/2020 | Hande et al. | |
| 2022/0191739 | A1* | 6/2022 | Itoh | H04W 28/0268 |

FOREIGN PATENT DOCUMENTS

| | | |
|---|---|---|
| CN | 111200848 A | 5/2020 |
| CN | 111277993 A | 6/2020 |
| CN | 111373792 A | 7/2020 |
| JP | 2019047163 A | 3/2019 |
| JP | 2022501895 A | 1/2022 |
| WO | 2019098745 A1 | 5/2019 |
| WO | 2019201747 A1 | 10/2019 |
| WO | 2020103842 A1 | 5/2020 |
| WO | 2020104017 A1 | 5/2020 |

OTHER PUBLICATIONS

Nokia, Nokia Shanghai Bell, KI#3A: New Sol: Solution for Synchronizing Hold and Forward Buffers and RAN with Burst Arrival. SA WG2 Meeting #140E, Aug. 19-Sep. 2, 2020, Online, S2-2005739, 5 pages.

3GPP TR 23.734 V16.2.0 (Jun. 2019), 3rd Generation Partnership Project; Technical Specification Group Services and System Aspects; Study on enhancement of 5G System (5GS) for vertical and Local Area Network (LAN) services (Release 16), 117 pages.

OPPO, "Solution for KI5:Network controlled UL data transmission delay", SA WG2 Meeting #127 bis, S2-184789, Newport Beach, CA, US, May 28-Jun. 1, 2018, 3 pages.

3GPP TS 23.501 V16.5.1 (Aug. 2020), "3rd Generation Partnership Project, Technical Specification Group Services and System Aspects, System architecture for the 5G System (5GS), Stage 2 (Release 16)", Sophia Antipolis, Valbonne—France, 440 pages.

3GPP TS 23.503 V16.5.1 (Aug. 2020), "3rd Generation Partnership Project, Technical Specification Group Services and System Aspects, Policy and charging control framework for the 5G System (5GS), Stage 2 (Release 16)", Sophia Antipolis, Valbonne—France, 118 pages.

3GPP TS 23.502 V16.5.1 (Aug. 2020), "3rd Generation Partnership Project, Technical Specification Group Services and System Aspects, Procedures for the 5G System (5GS), Stage 2 (Release 16)", Sophia Antipolis, Valbonne—France, 594 pages.

3GPP TS 22.261 V17.3.0 (Jul. 2020), "3rd Generation Partnership Project, Technical Specification Group Services and System Aspects, Service requirements for the 5G system, Stage 1 (Release 17)", Sophia Antipolis, Valbonne—France, 83 pages.

3GPP TS 38.300 V15.10.0 (Jul. 2020), 3rd Generation Partnership Project; Technical Specification Group Radio Access Network; NR; NR and NG-RAN Overall Description; Stage 2 (Release 15), 100 pages.

3GPP TSG-RAN WG2 Meeting #103bis, R2-1815270, "Enhancement for Time-Sensitive Networking", CMCC, Oct. 8-12, 2018, total 10 pages.

\* cited by examiner

DOWNLINK TRANSMISSION METHOD AND COMMUNICATION APPARATUS

CROSS-REFERENCE TO RELATED APPLICATIONS

This application is a continuation of International Application No. PCT/CN2021/105986, filed on Jul. 13, 2021, which claims priority to Chinese Patent Application No. 202010877423.7, filed on Aug. 27, 2020. The disclosures of the aforementioned applications are hereby incorporated by reference in their entireties.

TECHNICAL FIELD

This application relates to the communications field, and more specifically, to a downlink transmission method and a communication apparatus.

BACKGROUND

In a communication system, in consideration of particularity of scheduling of an access network element, for example, an uplink-downlink configuration and a scheduling protection window between slots, a scheduling delay may be introduced to an access network element side by a downlink service packet. For example, if a moment at which the downlink service packet arrives at the access network element is within a scheduling window of the access network element, the downlink service packet can be scheduled only when at least a nearest downlink scheduling window arrives. If a nearest scheduling window is an uplink scheduling window rather than a downlink scheduling window, the scheduling waiting delay introduced to the access network element side is greater than at least a length of one scheduling window. For another example, if a moment at which the downlink service packet arrives at the access network element is within a processing window of the access network element, the downlink service packet can be scheduled only when at least a downlink scheduling window after the next arrives. However, the scheduling waiting delay introduced to the access network element side may cause an end-to-end delay of the downlink service packet to fail to be guaranteed.

SUMMARY

This application provides a downlink transmission method and a communication apparatus, to reduce a scheduling delay on an access network element side, and help guarantee an end-to-end delay requirement of a downlink service packet.

According to a first aspect, a downlink transmission method is provided, and includes: A session management network element obtains a first delay, where the first delay is duration between an expected moment at which a downlink service packet arrives at an access network element and an estimated moment at which the downlink service packet arrives at the access network element, the expected moment at which the downlink service packet arrives at the access network element is within a first scheduling window, and a next scheduling window adjacent to the first scheduling window is a downlink scheduling window. The session management network element sends time adjustment information related to the first delay to a first network element, where the first network element is a user plane network element or an application network element, the time adjustment information is for determining a first moment at which the user plane network element sends the downlink service packet, or is used by an application server to determine a second moment at which the downlink service packet is sent, and a third moment at which the downlink service packet sent by the user plane network element at the first moment or sent by the application server at the second moment arrives at the access network element is within the first scheduling window.

According to the downlink transmission method provided in this application, the application server or the user plane network element may adjust, based on the time adjustment information provided by the session management network element, a moment of sending the downlink service packet, so that when the downlink service packet is sent at an adjusted sending moment, the moment at which the downlink service packet arrives at the access network element may be within the first scheduling window of the access network element, the downlink service packet may be scheduled in a second downlink scheduling window, and the second downlink scheduling window is the next scheduling window adjacent to the first scheduling window. This helps reduce a scheduling waiting delay of scheduling the downlink service by the access network element, and helps guarantee an end-to-end delay of the downlink service packet. Further, the application server or the user plane network element usually receives a plurality of downlink service packets for a plurality of access network elements. According to the method, the application server or the user plane network element can preferentially process another downlink service packet while buffering the downlink service packets, to properly use a resource, mitigate and avoid a processing conflict between downlink service packets sent to different access network element nodes, improve processing efficiency of the downlink service packets in the application server or the user plane network element, and help guarantee end-to-end delay requirements of the downlink service packets and the another downlink service packet.

With reference to the first aspect, in some implementations of the first aspect, that a session management network element obtains a first delay includes: The session management network element obtains configuration information of a radio resource of the access network element and the estimated moment at which the downlink service packet arrives at the access network element. The session management network element determines the first delay based on the configuration information of the radio resource and the estimated moment at which the downlink service packet arrives at the access network element.

Optionally, the access network element may report the configuration information of the radio resource and a corresponding cell identifier (ID) to a mobility management network element (for example, an access and mobility management function (AMF)) in an NG setup process, and the session management network element may obtain the configuration information of the radio resource and the cell ID from the mobility management network element. The NG setup process may also be referred to as an N2 setup process, and an interface between the access network element and the mobility management network element is referred to as an NG interface.

Alternatively, in a registration process of a terminal device, when the access network element forwards a registration request to a mobility management network element, the registration request may carry a cell ID and the configuration information of the radio resource, or carry a cell ID, a terminal device ID, and the configuration information of the radio resource. Then, the session management network element may obtain the configuration information of the radio resource from the mobility management network element.

Alternatively, during session setup, the access network element may send a cell ID and the corresponding configuration information of the radio resource, or send a cell ID, a terminal device ID, and the corresponding configuration information of the radio resource to the session management network element via an N2 message.

Alternatively, the access network element may provide a network data analytics function (NWDAF) network element with the configuration information that is of the radio resource and that corresponds to a cell, and the session management network element may obtain the configuration information of the radio resource and a corresponding cell ID from the NWDAF.

With reference to the first aspect, in some implementations of the first aspect, that the session management network element determines the first delay based on the configuration information of the radio resource and the estimated moment at which the downlink service packet arrives at the access network element includes: The session management network element determines, based on the configuration information of the radio resource and the estimated moment at which the downlink service packet arrives at the access network element, an estimated second downlink scheduling window for the access network element to schedule the downlink service packet. The session management network element determines a boundary of a third scheduling window based on the configuration information of the radio resource and the second downlink scheduling window, where the third scheduling window is a scheduling window previous to the second downlink scheduling window. The session management network element determines the first delay based on the boundary of the third scheduling window.

With reference to the first aspect, in some implementations of the first aspect, the configuration information of the radio resource includes a slot start moment, slot duration, an uplink-downlink slot configuration, and a scheduling processing delay of the access network element.

With reference to the first aspect, in some implementations of the first aspect, that a session management network element obtains a first delay includes: The session management network element obtains the estimated moment at which the downlink service packet arrives at the access network element. The session management network element sends the estimated moment at which the downlink service packet arrives at the access network element to the access network element. The session management network element receives the first delay from the access network element.

With reference to the first aspect, in some implementations of the first aspect, that the session management network element obtains the estimated moment at which the downlink service packet arrives at the access network element includes: The session management network element determines, based on a transmission delay from the user plane network element to the access network element and an estimated moment at which the downlink service packet arrives at the user plane network element, the estimated moment at which the downlink service packet arrives at the access network element; or the session management network element obtains quality of service (QoS) information of the downlink service from a policy control network element, and determines, based on the QoS information, the estimated moment at which the downlink service packet arrives at the access network element.

With reference to the first aspect, in some implementations of the first aspect, when the first network element is the user plane network element, the time adjustment information is the first delay or a fourth moment determined based on the first delay and the estimated moment at which the downlink service packet arrives at the user plane network element.

With reference to the first aspect, in some implementations of the first aspect, when the first network element is the application network element, the time adjustment information includes one or more of the following: the first delay, an expected moment that is determined based on the first delay and at which the downlink service packet arrives at the user plane network element, and an expected moment that is determined based on the first delay and at which the downlink service packet arrives at a terminal device.

With reference to the first aspect, in some implementations of the first aspect, the method further includes: The session management network element determines the third moment based on the time adjustment information. The session management network element sends the third moment to the access network element, where the third moment is used by the access network element to schedule the downlink service packet.

For example, the access network element may perform semi-persistent scheduling on the downlink service packet based on a periodicity of the downlink service packet and the moment at which the downlink service packet arrives at the access network element, that is, allocate, to the downlink service packet once, a same time-frequency resource that can be periodically and repeatedly used, to reduce an end-to-end transmission delay of the downlink service packet and save a control plane resource.

According to a second aspect, a downlink transmission method is provided, and includes: A user plane network element receives, from a session management network element, time adjustment information related to a first delay, where the first delay is duration between an expected moment at which a downlink service packet arrives at an access network element and an estimated moment at which the downlink service packet arrives at the access network element, the expected moment at which the downlink service packet arrives at the access network element is within a first scheduling window, and a next scheduling window adjacent to the first scheduling window is a downlink scheduling window. The user plane network element determines, based on the time adjustment information, a first moment at which the user plane network element sends the downlink service packet, where a third moment at which the downlink service packet sent at the first moment arrives at the access network element is within the first scheduling window.

According to the downlink transmission method provided in this application, the user plane network element may adjust, based on the time adjustment information provided by the session management network element, a moment of sending the downlink service packet, so that when the downlink service packet is sent at an adjusted sending moment, the moment at which the downlink service packet arrives at the access network element may be within the first scheduling window of the access network element, the downlink service packet may be scheduled in a second downlink scheduling window, and the second downlink scheduling window is the next scheduling window adjacent to the first scheduling window. This helps reduce a scheduling waiting delay of scheduling the downlink service by the access network element, and helps guarantee an end-to-end delay of the downlink service packet. Further, the user plane network element usually receives a plurality of downlink service packets for a plurality of access network elements. According to the method, the user plane network element can preferentially process another downlink service packet while buffering the downlink service packets, to properly use a resource, mitigate and avoid a processing conflict between downlink service packets sent to different access network element nodes, improve processing efficiency of the downlink service packets in the user plane network element, and help guarantee end-to-end delay requirements of the downlink service packets and the another downlink service packet.

With reference to the second aspect, in some implementations of the second aspect, the time adjustment information is the first delay or a fourth moment determined based on the first delay and an estimated moment at which the downlink service packet arrives at the user plane network element.

According to a third aspect, a downlink transmission method is provided, and includes: An application network element receives, from a session management network element, time adjustment information related to a first delay, where the first delay is duration between an expected moment at which a downlink service packet arrives at an access network element and an estimated moment at which the downlink service packet arrives at the access network element, the expected moment at which the downlink service packet arrives at the access network element is within a first scheduling window, and a next scheduling window adjacent to the first scheduling window is a downlink scheduling window. The application network element determines, based on the time adjustment information, a second moment at which an application server sends the downlink service packet, where a third moment at which the downlink service packet sent at the second moment arrives at the access network element is within the first scheduling window.

According to the downlink transmission method provided in this application, the application network element may adjust, based on the time adjustment information provided by the session management network element, a moment at which the application server sends the downlink service packet, so that when the downlink service packet is sent at an adjusted sending moment, the moment at which the downlink service packet arrives at the access network element may be within the first scheduling window of the access network element, the downlink service packet may be scheduled in a second downlink scheduling window, and the second downlink scheduling window is the next scheduling window adjacent to the first scheduling window. This helps reduce a scheduling waiting delay of scheduling the downlink service by the access network element, and helps guarantee an end-to-end delay of the downlink service packet. Further, the application server usually receives a plurality of downlink service packets for a plurality of access network elements. According to the method, the application server can preferentially process another downlink service packet while buffering the downlink service packets, to properly use a resource, mitigate and avoid a processing conflict between downlink service packets sent to different access network element nodes, improve processing efficiency of the downlink service packets in the application server, and help guarantee end-to-end delay requirements of the downlink service packets and the another downlink service packet.

With reference to the third aspect, in some implementations of the third aspect, the time adjustment information includes one or more of the following: the first delay, an expected moment that is determined based on the first delay and at which the downlink service packet arrives at a user plane network element, and an expected moment that is determined based on the first delay and at which the downlink service packet arrives at a terminal device.

According to a fourth aspect, a downlink transmission method is provided, and includes: An access network element receives, from a session management network element, an estimated moment at which a downlink service packet arrives at the access network element. The access network element determines a first delay based on the estimated moment at which the downlink service packet arrives at the access network element, where the first delay is duration between an moment that is expected by the access network element and at which the downlink service packet arrives at the access network element and the estimated moment at which the downlink service packet arrives at the access network element, the moment that is expected by the access network element and at which the downlink service packet arrives at the access network element is within a first scheduling window, and a next scheduling window adjacent to the first scheduling window is a downlink scheduling window. The access network element sends the first delay to the session management network element, where the first delay is used by the session management network element to adjust a moment at which a user plane network element sends the downlink service packet and/or a moment at which an application server sends the downlink service packet.

According to the downlink transmission method provided in this application, the access network element may provide the determined first delay for the session management network element, and the session management network element adjusts, based on the first delay, the moment at which the user plane network element sends the downlink service packet and/or the moment at which the application server sends the downlink service packet, so that the user plane network element may send the downlink service packet at an adjusted moment, and/or the application server may send the downlink service packet at an adjusted moment. In this way, a moment at which the downlink service packet arrives at the access network element may be within the first scheduling window of the access network element, the downlink service packet may be scheduled in a second downlink scheduling window, and the second downlink scheduling window is the next scheduling window adjacent to the first scheduling window. This helps reduce a scheduling waiting delay of scheduling the downlink service by the access network element, and helps guarantee an end-to-end delay requirement of the downlink service packet.

With reference to the fourth aspect, in some implementations of the fourth aspect, that the access network element determines a first delay based on the estimated moment at which the downlink service packet arrives at the access network element includes: The access network element determines the first delay based on the estimated moment at which the downlink service packet arrives at the access network element and configuration information of a radio resource of the access network element.

With reference to the fourth aspect, in some implementations of the fourth aspect, the configuration information of the radio resource includes a slot start moment, slot duration, an uplink-downlink slot configuration, and a scheduling processing delay of the access network element.

With reference to the fourth aspect, in some implementations of the fourth aspect, that the access network element determines the first delay based on the estimated moment at which the downlink service packet arrives at the access network element and configuration information of a radio resource of the access network element includes: The access network element determines, based on the configuration information of the radio resource and the estimated moment at which the downlink service packet arrives at the access network element, an estimated second downlink scheduling window for the access network element to schedule the downlink service. The access network element determines a boundary of a third scheduling window based on the configuration information of the radio resource and the second downlink scheduling window, where the third scheduling window is a scheduling window previous to the second downlink scheduling window. The access network element determines the first delay based on the boundary of the third scheduling window.

According to a fifth aspect, a downlink transmission method is provided, and includes: An access network element receives, from a session management network element, an estimated moment at which a downlink service packet arrives at the access network element. The access network element determines time adjustment information based on the estimated moment at which the downlink service packet arrives at the access network element and configuration information of a radio resource. The access network element sends the time adjustment information to the session management network element, where the time adjustment information is used by the session management network element to adjust a moment at which a user plane network element sends the downlink service packet and/or a moment at which an application server sends the downlink service packet.

According to the downlink transmission method provided in this application, the access network element may determine the time adjustment information based on the estimated moment at which the downlink service packet arrives at the access network element and the configuration information of the radio resource, and may provide the time adjustment information for the session management network element. The session management network element may adjust, based on the time adjustment information, the moment at which the user plane network element sends the downlink service packet and/or the moment at which the application server sends the downlink service packet, so that the user plane network element may send the downlink service packet at an adjusted moment, and/or the application server may send the downlink service packet at an adjusted moment. In this way, a moment at which the downlink service packet arrives at the access network element may be within a first scheduling window of the access network element, the downlink service packet may be scheduled in a second downlink scheduling window, and the second downlink scheduling window is a next scheduling window adjacent to the first scheduling window. This helps reduce a scheduling waiting delay of scheduling the downlink service by the access network element, and helps guarantee an end-to-end delay requirement of the downlink service packet.

With reference to the fifth aspect, in some implementations of the fifth aspect, that the access network element determines time adjustment information based on the estimated moment at which the downlink service packet arrives at the access network element and configuration information of a radio resource includes: The access network element determines a first delay based on the estimated moment at which the downlink service packet arrives at the access network element and the configuration information of the radio resource, where the first delay is duration between a moment that is expected by the access network element and at which the downlink service packet arrives at the access network element and the estimated moment at which the downlink service packet arrives at the access network element, the moment that is expected by the access network element and at which the downlink service packet arrives at the access network element is within a first scheduling window, and a next scheduling window adjacent to the first scheduling window is a downlink scheduling window. The access network element determines the time adjustment information based on the first delay.

With reference to the fifth aspect, in some implementations of the fifth aspect, that the access network element determines time adjustment information based on the estimated moment at which the downlink service packet arrives at the access network element and configuration information of a radio resource includes: The access network element determines, based on the estimated moment at which the downlink service packet arrives at the access network element and the configuration information of the radio resource, an estimated second downlink scheduling window for the access network element to schedule the downlink service packet. The access network element determines a boundary of a third scheduling window based on the second downlink scheduling window, where the third scheduling window is a scheduling window previous to the second downlink scheduling window. The access network element determines the time adjustment information based on the boundary of the third scheduling window.

With reference to the fifth aspect, in some implementations of the fifth aspect, the configuration information of the radio resource includes a slot start moment, slot duration, an uplink-downlink slot configuration, and a scheduling processing delay of the access network element.

According to a sixth aspect, a downlink transmission method is provided, and includes: A session management network element obtains first information, where the first information includes configuration information of a radio resource and an estimated moment at which a downlink service packet arrives at an access network element. The session management network element sends the first information to a user plane network element, where the first information is for determining a first moment at which the user plane network element sends the downlink service packet, a third moment at which the downlink service packet sent at the first moment arrives at the access network element is within a first scheduling window of the access network element, and a next scheduling window adjacent to the first scheduling window is a downlink scheduling window.

According to the downlink transmission method provided in this application, the user plane network element may determine the sending moment of the downlink service packet based on the first information provided by the session management network element, so that the moment at which the downlink service packet arrives at the access network element may be within the first scheduling window of the access network element, the downlink service packet may be scheduled in a second downlink scheduling window, and the second downlink scheduling window is the next scheduling window adjacent to the first scheduling window. This helps reduce a scheduling waiting delay of scheduling the downlink service by the access network element, and helps guarantee an end-to-end delay of the downlink service packet.

With reference to the sixth aspect, in some implementations of the sixth aspect, the configuration information of the radio resource includes a slot start moment, slot duration, an uplink-downlink slot configuration, and a scheduling processing delay of the access network element.

With reference to the sixth aspect, in some implementations of the sixth aspect, the method further includes: The session management network element receives second information from the user plane network element, where the second information is the first moment or a waiting delay of the downlink service packet on the user plane network element. The session management network element determines the third moment based on the second information. The session management network element sends the third moment to the access network element.

According to a seventh aspect, a downlink transmission method is provided, and includes: A user plane network element receives first information from a session management network element, where the first information includes configuration information of a radio resource and an estimated moment at which a downlink service packet arrives at an access network element. The user plane network element determines, based on the first information, a first moment at which the downlink service packet is sent, where a third moment at which the downlink service packet sent at the first moment arrives at the access network element is within a first scheduling window of the access network element, and a next scheduling window adjacent to the first scheduling window is a downlink scheduling window.

According to the downlink transmission method provided in this application, the user plane network element may determine the sending moment of the downlink service packet based on the first information provided by the session management network element, so that the moment at which the downlink service packet arrives at the access network element may be within the first scheduling window of the access network element, the downlink service packet may be scheduled in a second downlink scheduling window, and the second downlink scheduling window is the next scheduling window adjacent to the first scheduling window. This helps reduce a scheduling waiting delay of scheduling the downlink service by the access network element, and helps guarantee an end-to-end delay of the downlink service packet.

With reference to the seventh aspect, in some implementations of the seventh aspect, the configuration information of the radio resource includes a slot start moment, slot duration, an uplink-downlink slot configuration, and a scheduling processing delay of the access network element.

With reference to the seventh aspect, in some implementations of the seventh aspect, that the user plane network element determines, based on the first information, a first moment at which the downlink service packet is sent includes: The user plane network element determines a first delay based on the first information, where the first delay is duration between an expected moment at which the downlink service packet arrives at the access network element and the estimated moment at which the downlink service packet arrives at the access network element. The user plane network element determines the first moment based on the first delay.

With reference to the seventh aspect, in some implementations of the seventh aspect, the method further includes: The user plane network element sends second information to the session management network element, where the second information is the first moment or a waiting delay of the downlink service on the user plane network element, and the second information is for determining the third moment.

According to an eighth aspect, a communication apparatus is provided, and includes modules or units configured to perform the method according to any one of the first aspect to the seventh aspect or the possible implementations of the first aspect to the seventh aspect.

According to a ninth aspect, an apparatus is provided, and includes a processor. The processor is coupled to a memory, and may be configured to execute instructions in the memory, so that the apparatus performs the method according to any one of the first aspect to the seventh aspect or the possible implementations of the first aspect to the seventh aspect. Optionally, the apparatus further includes the memory. Optionally, the apparatus further includes an interface circuit, and the processor is coupled to the interface circuit.

According to a tenth aspect, a processor is provided, and includes an input circuit, an output circuit, and a processing circuit. The processing circuit is configured to receive a signal through the input circuit, and transmit a signal through the output circuit, so that the processor performs the method according to any one of the first aspect to the seventh aspect or the possible implementations of the first aspect to the seventh aspect.

In a specific implementation process, the processor may be a chip, the input circuit may be an input pin, the output circuit may be an output pin, and the processing circuit may be a transistor, a gate circuit, a trigger, various logic circuits, and the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to an eleventh aspect, a processing apparatus is provided, and includes a processor and a memory. The processor is configured to read instructions stored in the memory, and may receive a signal by using a receiver, and transmit a signal by using a transmitter, to perform the method according to any one of the first aspect to the seventh aspect and the possible implementations of the first aspect to the seventh aspect.

Optionally, there are one or more processors, and there are one or more memories.

Optionally, the memory may be integrated with the processor, or the memory and the processor are separately disposed.

In a specific implementation process, the memory may be a non-transitory memory such as a read-only memory (ROM). The memory and the processor may be integrated into a same chip, or may be separately disposed on different chips. A type of the memory and a manner in which the memory and the processor are disposed are not limited in this embodiment of this application.

The processing apparatus according to the eleventh aspect may be a chip. The processor may be implemented by using hardware or software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, or may exist independently outside the processor.

According to a twelfth aspect, a computer program product is provided. The computer program product includes a computer program (also referred to as code or instructions). When the computer program is run, a computer is enabled to perform the method according to any one of the first aspect to the seventh aspect or the possible implementations of the first aspect to the seventh aspect.

According to a thirteenth aspect, a computer-readable medium is provided. The computer-readable medium stores a computer program (also referred to as code or instructions). When the computer program is run on a computer, the computer is enabled to perform the method according to any one of the first aspect to the seventh aspect or the possible implementations of the first aspect to the seventh aspect.

DETAILED DESCRIPTION OF ILLUSTRATIVE EMBODIMENTS

The following describes technical solutions of this application with reference to accompanying drawings.

The technical solutions in embodiments of this application may be applied to various communication systems, for example, a long term evolution (LTE) system, a 5th generation (5G) system, a new radio (NR) system, or another communication system that may appear in the future.

Figure 1:
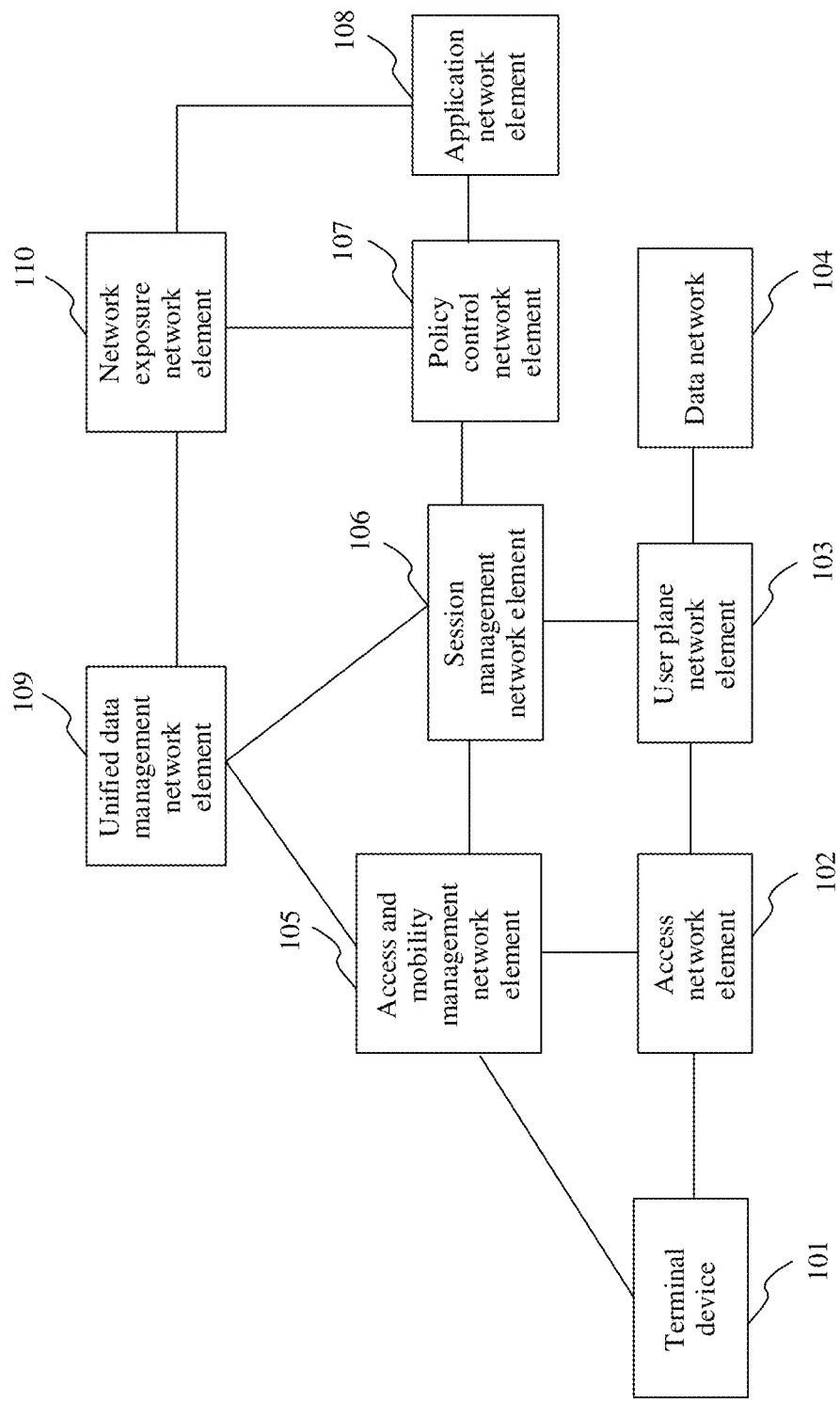
FIG. 1 is a diagram of an architecture of a system that may be used in this application.

FIG. 1 is a diagram of an architecture of a system 100 that may be used in this application. As shown in FIG. 1, the system 100 may include one or more of the following devices: a terminal device 101, an access network element 102, a user plane network element 103, a data network 104, an access and mobility management network element 105, a session management network element 106, a policy control network element 107, an application network element 108, a unified data management network element 109, and a network exposure network element 110.

The terminal device 101 may be user equipment (UE), a user, an access terminal, a subscriber unit, a subscriber station, a mobile station, a remote station, a remote terminal, a mobile device, a user terminal, a terminal, a wireless communication device, a user agent, or a user apparatus, for example, may be a mobile phone, a tablet (pad), a computer having a wireless transceiver function, a virtual reality (VR) terminal device, an augmented reality (AR) terminal device, a wireless terminal in industrial control, a wireless terminal in self driving, a wireless terminal in a telemedicine, a wireless terminal in a smart grid, a wireless terminal in transportation safety, a wireless terminal in a smart city, a wireless terminal in a smart home, and the like. The terminal device 110 may alternatively be an apparatus or a circuit structure disposed in the foregoing various devices, for example, a chip or a chip system.

The access network element 102 can manage a radio resource, provide an access service for the terminal device, and further complete forwarding of a control signal and user data between the terminal device and a core network.

The access network element 102 may be a transmission reception point (TRP), may be an evolved NodeB (eNB or eNodeB) in an LTE system, may be a home base station. (for example, home evolved NodeB or home NodeB, HNB) or a base band unit (base band unit, BBU), or may be a radio controller in a cloud radio access network (CRAN) scenario. Alternatively, the access network device may be a relay station, an access point, a vehicle-mounted device, a wearable device, an access network device in a 5G network, an access network device in a future evolved public land mobile network (PLMN), or the like, may be an access point (AP) in a WLAN, or may be a gNB in a new radio (NR) system. This is not limited in embodiments of this application. In a network structure, the access network device may include a central unit (CU) node, a distributed unit (DU) node, an access network device including a CU node and a DU node, or an access network device including a CU-control plane node (CU-CP node), a CU-user plane node (CU-UP node), and a DU node.

The user plane network element 103 is mainly responsible for processing a user packet, for example, forwarding and charging.

The data network 104 is a carrier network that provides a data transmission service for a user, for example, an IP multimedia service (IMS) or the Internet. The DN may include an application server (AS). The AS is a software framework, provides an environment in which an application program is run, and is configured to provide the application program with services such as security, data, transaction support, load balancing, and large-scale distributed system management. The terminal device obtains an application packet by communicating with the AS. It should be noted that the AF is a control plane of the AS.

The access and mobility management network element 105 is mainly responsible for mobility management in a mobile network, for example, user location update, user network registration, and user handover.

The session management network element 106 is mainly responsible for session management in the mobile network, for example, session establishment, modification, and release. Specific functions may be, for example, allocating an IP address to the user and selecting a user plane network element that provides a packet forwarding function.

The policy control network element 107 is responsible for providing the access and mobility management network element and the session management network element with policies such as a QoS policy and a slice selection policy.

The application network element 108 is responsible for providing a service for a 3GPP network, interacting with the policy control network element to perform policy control, and the like.

The unified data management network element 109 is configured to store user data such as subscription information and authentication/authorization information.

The network exposure network element 110 provides a framework, authentication, and an interface that are related to network capability exposure, and transfers information between a 5G system network function and another network function.

It should be understood that the foregoing devices or network elements may be apparatuses with corresponding functions, or may be software/hardware modules (for example, chips) inside the apparatuses, or the like. It should be further understood that any device or network element in this application may be implemented in a form of software or a combination of software and hardware.

Figure 2:
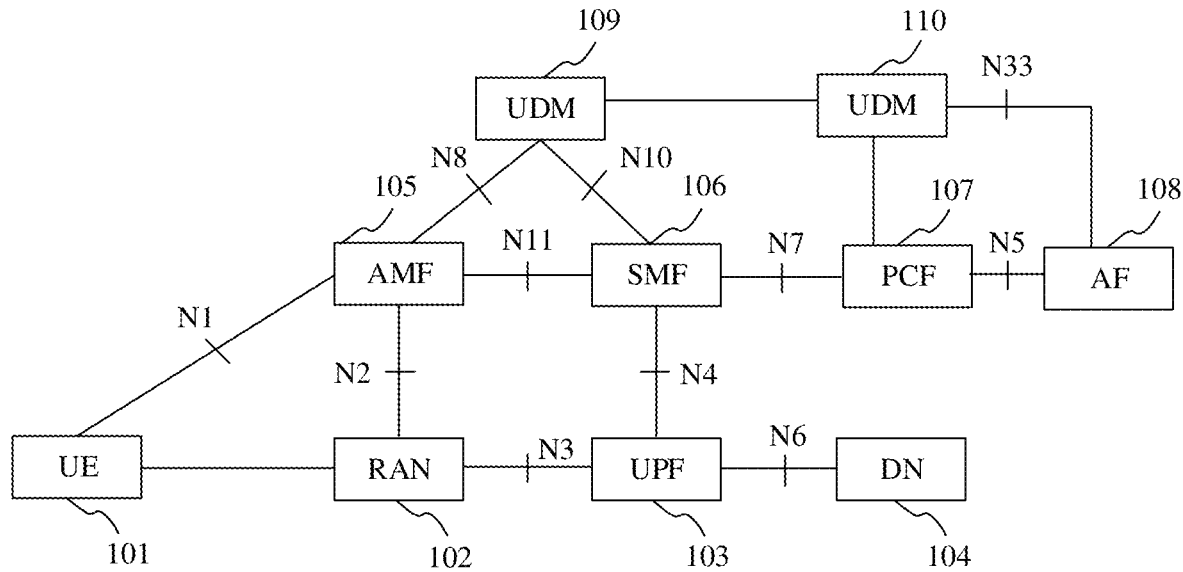
FIG. 2 is a diagram of an architecture of a 5G system.

In an example, the system 100 shown in FIG. 1 may be a 5G system shown in FIG. 2. It should be understood that the system 100 may alternatively be a 4G system or another system. This is not limited in this application.

FIG. 2 is a schematic diagram of an architecture of a 5G system. In the diagram of the architecture of the system, a network element that has a same reference numeral as that in FIG. 1 is a name of a corresponding network element in FIG. 1 in the current 5G system. Refer to FIG. 2, the architecture of the 5G system may include one or more of the following network elements: UE 101, a (radio) access network ((R)AN) 102, a user plane function (UPF) 103, a data network (DN) 104, an access and mobility management function (AMF) 105, a session management function (SMF) 106, a policy control function (PCF) 107, an application function (AF) 108, a unified data management (UDM) 109, and a network exposure function 110.

It should be understood that a name of each network element shown in FIG. 2 is merely a name, and the name constitutes no limitation on a function of the network element. In different networks, the foregoing network elements may alternatively have other names. This is not specifically limited in embodiments of this application. For example, in a 6G network, some or all of the foregoing network elements may still use terms in 5G, or may have other names. A general description is provided herein. Details are not described again below. Similarly, interfaces between the network elements shown in FIG. 2 are merely an example. In a 5G network and another future network, interfaces between network elements may alternatively not be the interfaces shown in the figure. This is not limited in this application.

It should be further understood that embodiments of this application are not limited to the architecture of the system shown in FIG. 2. For example, a communication system to which this application is applicable may include more or fewer network elements or devices. The devices or the network elements in FIG. 2 may be hardware, or may be software obtained through function division or a combination of the hardware and the software. The devices or the network elements in FIG. 2 may communicate with each other by using another device or network element.

In forwarding implementation of the conventional Ethernet, when a large quantity of data packets instantaneously arrive at a forwarding port, a high forwarding delay or a packet loss may be caused. Consequently, the conventional Ethernet cannot provide a service with high reliability and a guaranteed transmission delay, and cannot satisfy requirements in fields such as vehicle control and the industrial Internet. The institute of electrical and electronics engineers (IEEE) defines the time sensitive networking (TSN) standard for a requirement for reliable-delay transmission. The standard is based on layer 2 switching to provide a reliable-delay transmission service, to guarantee reliability of data transmission of a delay-sensitive service and a predictable end-to-end transmission delay.

The TSN is based on layer 2 transmission, and includes a TSN switch node (also referred to as a TSN bridge) and a TSN endpoint (end station or endpoint). Different from layer 2 forwarding, the TSN switch node does not forward a packet based on a media access control address (MAC address) learning, but forwards the packet according to a forwarding rule configured or created on the TSN switch node. A TSN flow is unidirectional. For the TSN flow, TSN endpoints are classified into a transmitting end (Talker) and receiving end (Listener). The TSN standard defines behavior of the TSN switch node and the TSN endpoint and a scheduling manner in which the TSN switch node forwards a data flow, to implement reliable-delay transmission. The TSN switch node uses a destination MAC address of the packet as an identifier of the data flow, and performs resource reservation and scheduling planning based on a delay requirement of a service flow, to guarantee reliability and a transmission delay according to a generated scheduling policy.

Figure 3:
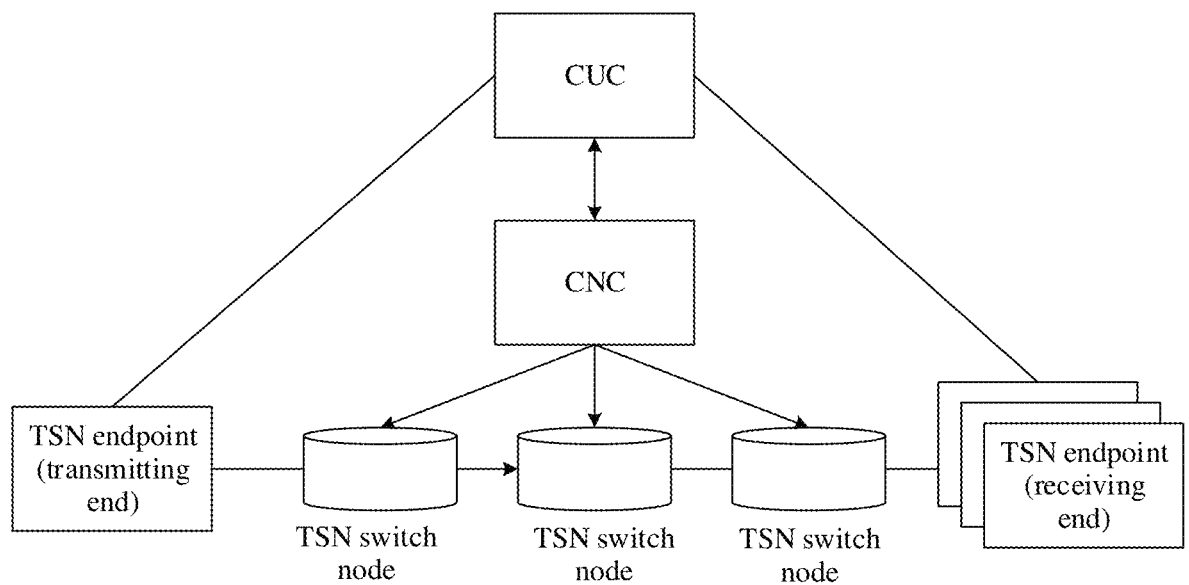
FIG. 3 is a schematic diagram of a TSN centralized management architecture.

The TSN standard defines a TSN centralized management architecture. FIG. 3 is a schematic diagram of a TSN centralized management architecture. Refer to FIG. 3. The architecture includes TSN endpoints (Talker/Listener), TSN switch nodes, and control plane network elements. The control plane network elements include a centralized user configuration (CUC) and a centralized network configuration (CNC). Details are as follows.

The TSN endpoint is a transmitting end or a receiving end of a data flow.

The TSN switch node reserves a resource for the data flow according to a definition of TSN, and schedules and forwards a data packet.

The CNC manages a topology of a TSN user plane and capability information of the TSN switch nodes (for example, sending delays of the TSN switch nodes and an internal processing delay between ports of the TSN switch nodes), generates a forwarding path of the data flow and processing policies (for example, a port for receiving and sending a packet and a time gate control parameter) on the TSN endpoints and the TSN switch nodes based on flow creation requests provided by the CUC, and then delivers processing policies on the TSN switch nodes to the corresponding TSN switch nodes.

The CUC is for collecting the flow creation requests of the TSN endpoints, and after matching requests of the talker and the listener, requesting the CNC to create the data flow and confirming the processing policies generated by the CNC.

Figure 4:
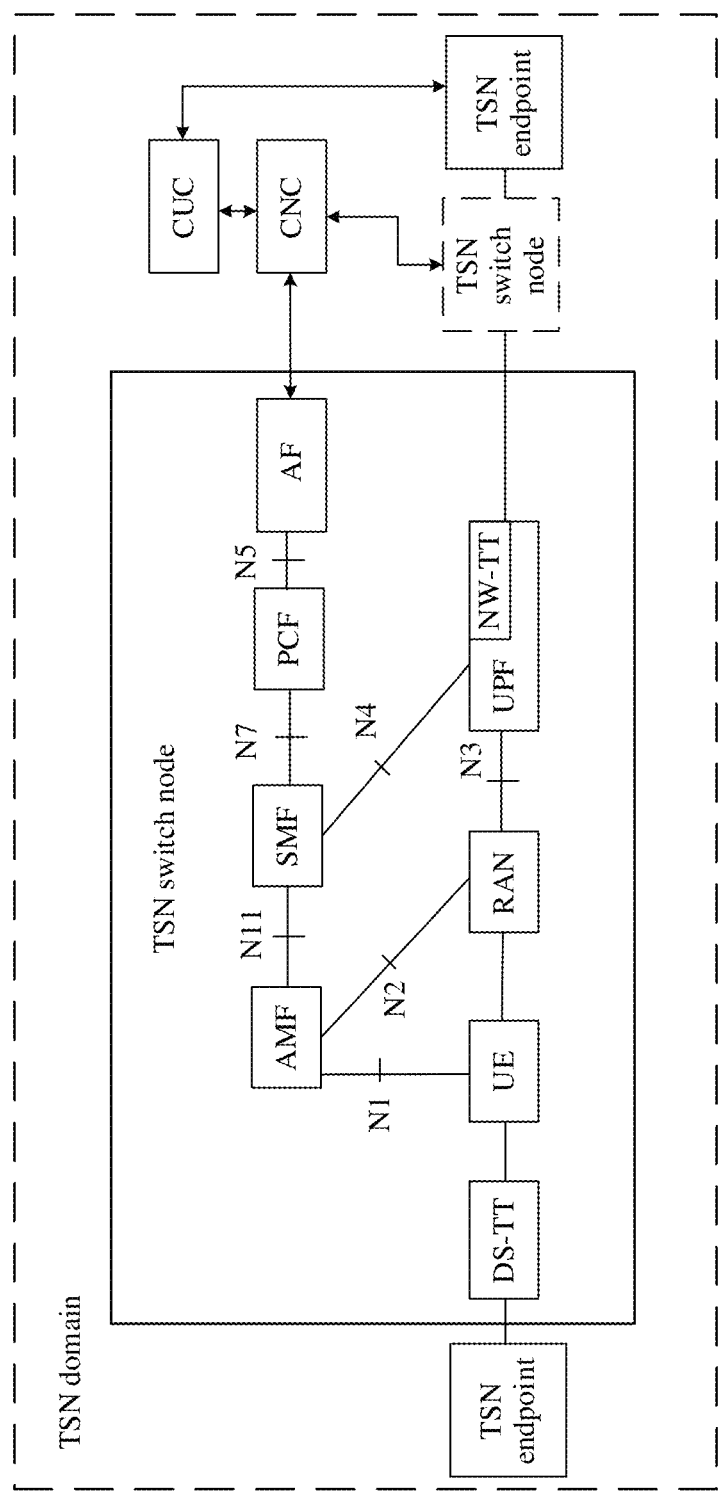
FIG. 4 is a diagram of an architecture for implementing end-to-end deterministic transmission of a user.

A 5G system (5GS) defines an architecture shown in FIG. 4 to implement end-to-end deterministic transmission of a user. Refer to FIG. 4. The 5GS is simulated as a switch node (referred to as a 5GS switch node below) in TSN, to implement a function of the TSN switch node, to implement end-to-end deterministic transmission in the TSN including the 5GS. An AF adapts information about the 5GS to information about the TSN switch node, interacts with a CNC, and sends, to the 5GS in a 5GS manner, information delivered by the CNC. A user plane TSN translator (Device) (a device side-TSN translator (DS-TT) hereinafter) and a TSN translator (UP) (a network side-TSN translator (NW-TT) hereinafter) are logical functions of a 5GS user plane, and are for implementing an external feature of the TSN switch node, for example, topology discovery, and implementing a CNC scheduling rule. The DS-TT may be deployed together with UE, or may be deployed independently. Similarly, the NW-TT may be deployed together with a UPF, or may be deployed independently.

It should be noted that, in this application, the UPF may be replaced with the NW-TT, and the UE may be replaced with the DS-TT.

In any system shown in FIG. 1 to FIG. 4, in consideration of particularity of scheduling of an access network element, for example, an uplink-downlink configuration and TTI scheduling protection, a scheduling delay may be introduced to an access network element side by a downlink service.

Figure 5:
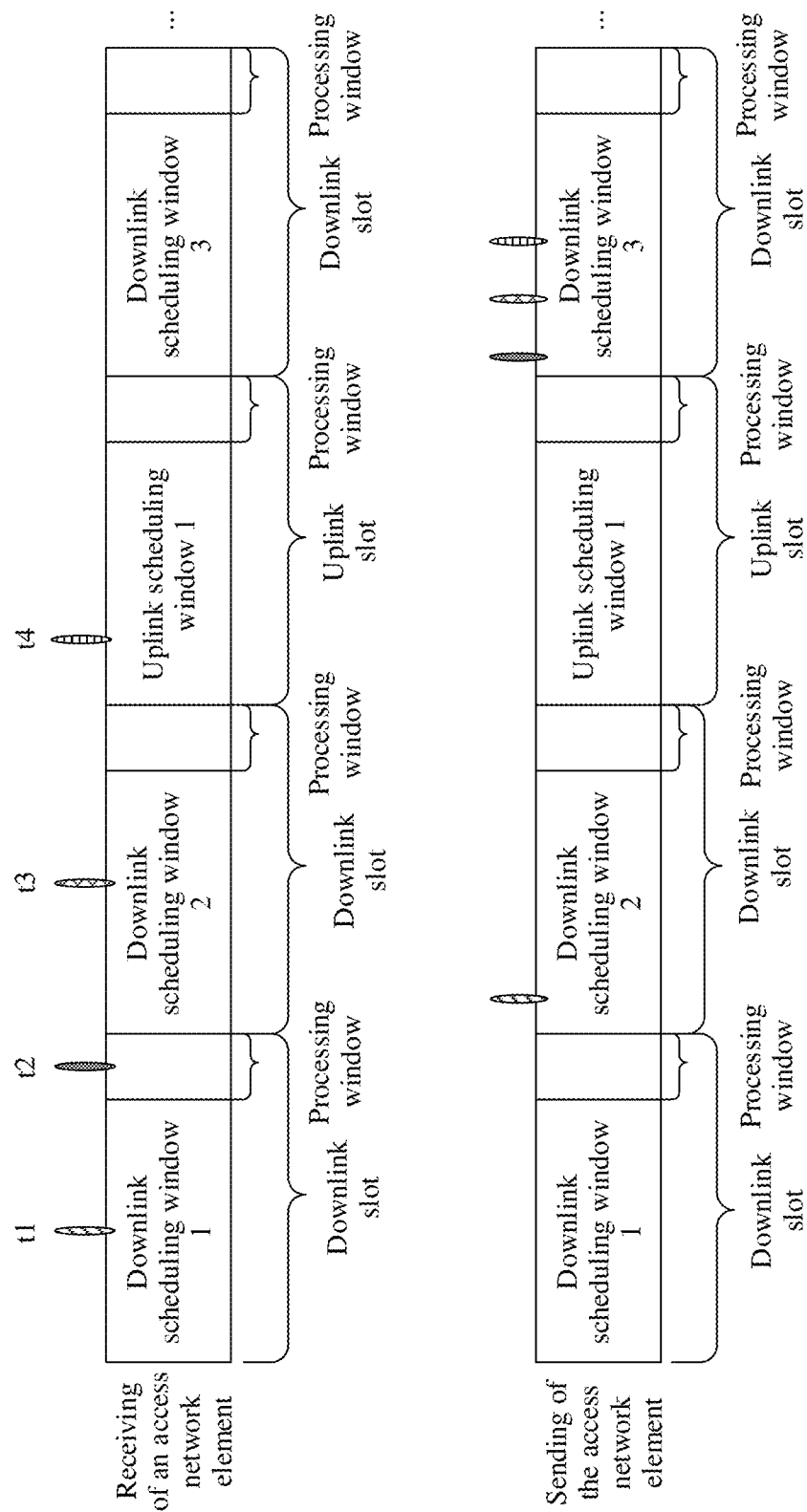
FIG. 5 is a schematic diagram of scheduling a downlink service packet by an access network element in a conventional technology.

For example, FIG. 5 is a schematic diagram of scheduling a downlink service packet by an access network element in a conventional technology. For example, FIG. 5 shows four slots, and each slot includes a scheduling window and a processing window. Each scheduling window may be for an uplink or a downlink. The processing window is used by the access network element to process the downlink service packet. The downlink service packet may be scheduled in a nearest downlink scheduling window only when the downlink service packet arrives before the processing window starts. However, the downlink service packet may arrive at the access network element at any moment For example, as shown in FIG. 5, if a moment t1 at which a downlink service packet arrives at the access network element is within a downlink scheduling window 1 of the access network element, the access network element may first schedule the downlink service packet in a next nearest downlink scheduling window (namely, a downlink scheduling window 2). However, if a moment t2 at which a downlink service packet arrives at the access network element is within a processing window of the access network element, the downlink service packet may be first scheduled in a downlink scheduling window (namely, a downlink scheduling window 3) after the next. If a moment t3 at which a downlink service packet arrives at the access network element is within a downlink scheduling window 2 of the access network element, and a next scheduling window adjacent to the downlink scheduling window 2 is an uplink scheduling window 1, the downlink service packet can be scheduled only when at least a nearest downlink scheduling window (namely, a downlink scheduling window 3) arrives. If a moment t4 at which a downlink service packet arrives at the access network element is within an uplink scheduling window 1 of the access network element, the access network element may first schedule the downlink service packet in a next nearest downlink scheduling window (namely, a downlink scheduling window 3). The downlink service packet received at the moment t2 in FIG. 5 needs a delay of at least two slots to be scheduled, and the downlink service packet received at the moment t3 in FIG. 5 needs a delay of at least one slot to be scheduled. Therefore, a scheduling delay introduced to an access network element side may cause an end-to-end delay of a service to fail to be guaranteed.

In view of this, this application provides a downlink transmission method, to reduce the scheduling delay on the access network element side. The method provided in this application is described below by using naming of a corresponding network element in a 5G network as an example.

It should be noted that duration of the processing window is equal to a scheduling processing delay of a RAN below. The processing window is used by the access network element to process the downlink service packet. The downlink service packet may be scheduled in the nearest downlink scheduling window only when the downlink service packet arrives before the processing window starts. A downlink service packet that arrives in the processing window needs to be scheduled in a nearest downlink scheduling window after the next. That is, at least one more slot needs to be waited.

It should be noted that a downlink service described in this application may be a periodic service. In other words, service packets may be sent at a fixed interval. The fixed interval is a sending periodicity of the downlink service packets. Usually, a size of a packet sent in a periodicity in an industrial scenario may also be fixed.

In this application, an SMF and an AF may not directly communicate with each other, and may communicate with each other by using a network element such as a PCF or an NEF. This is not limited in this application. The SMF and a RAN may not directly communicate with each other either, and may communicate with each other by using an AMF.

In this application, unless otherwise specified, a same term has a same meaning in different embodiments. For example, first time adjustment information is described only in a method 600. For meanings of the first time adjustment information below, refer to the descriptions in the method 600.

Figure 6:
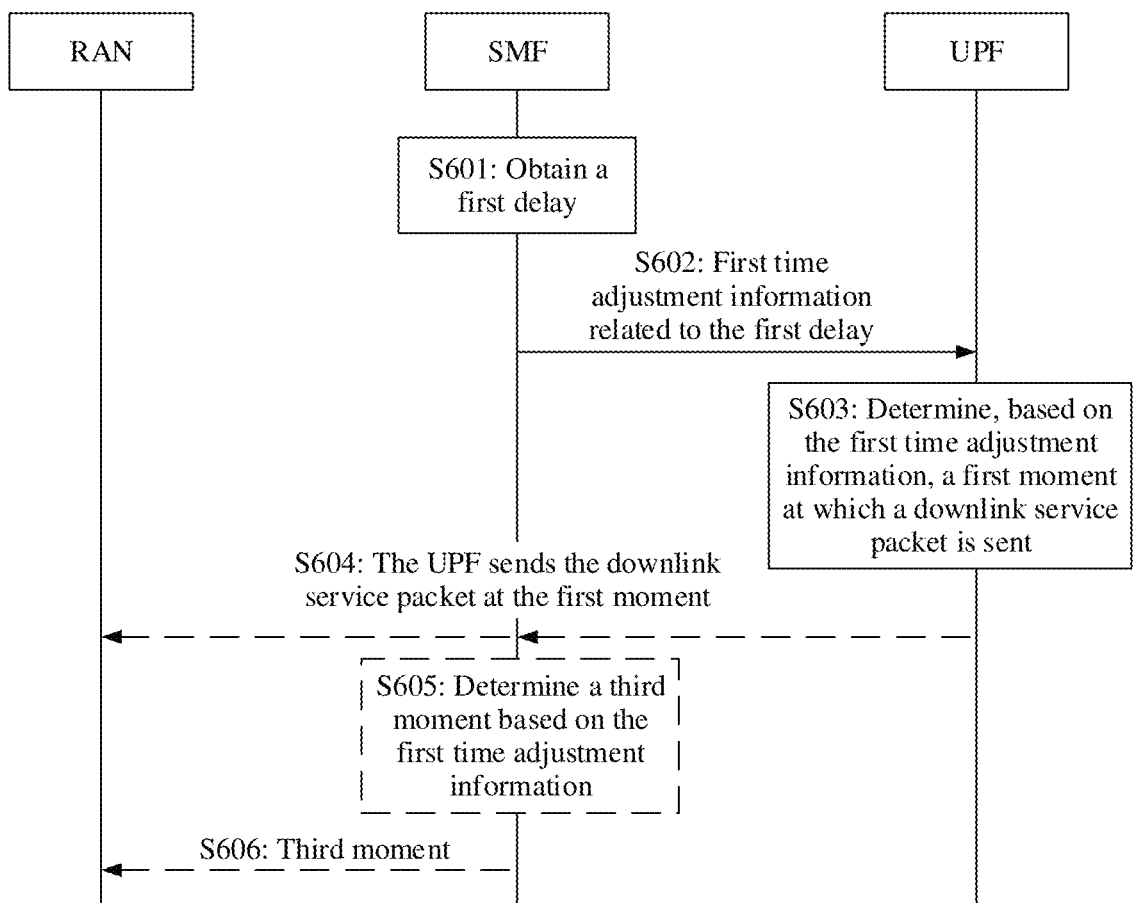
FIG. 6 is a schematic flowchart of a downlink transmission method according to this application.

FIG. 6 is a schematic flowchart of a downlink transmission method according to this application. The method 600 shown in FIG. 6 is described below.

S601: An SMF obtains a first delay.

The first delay is duration between an expected moment at which a downlink service packet arrives at a RAN and an estimated moment at which the downlink service packet arrives at the RAN. The expected moment at which the downlink service packet arrives at the RAN is within a first scheduling window, and a next scheduling window adjacent to the first scheduling window is a downlink scheduling window. "Estimated" may be understood as "originally planned" instead of actually occurring.

In this specification, the moment that is expected by the RAN and at which the downlink service packet arrives at the RAN is denoted as $t_{RANyt}$, and the estimated moment at which the downlink service packet arrives at the RAN is denoted as $t_{RANya}$.

In this case, First delay=$t_{RANyt}$-$t_{RANya}$.

For example, assuming that $t_{RANyt}$ is 10:30 and $t_{RANya}$ is 10:29, the first delay is 1 min.

The following describes two manners in which the SMF obtains the first delay.

Manner 1:

The first delay obtained by the SMF is determined by the SMF.

Optionally, the SMF may obtain configuration information of a radio resource of the RAN and the estimated moment $t_{RANya}$ at which the downlink service packet arrives at the RAN, and determine the first delay based on the configuration information of the radio resource and the estimated moment $t_{RANya}$ at which the downlink service packet arrives at the RAN.

For example, the configuration information of the radio resource may include at least one of a slot start moment, slot duration, or a quantity of symbols in a slot, an uplink-downlink slot configuration, and a scheduling processing delay of the RAN. The SMF may determine, based on the configuration information of the radio resource, a boundary of the scheduling window, a boundary of the processing window, and whether a scheduling window is an uplink scheduling window or a downlink scheduling window in FIG. 5.

For example, the RAN may report the configuration information of the radio resource and a corresponding cell ID to an AMF in an NG setup process, and the SMF may obtain the configuration information of the radio resource and the cell ID from the AMF. The NG setup process may also be referred to as an N2 setup process, and an interface between the RAN and the AMF is referred to as an NG interface.

Alternatively, in a registration process of UE, when the RAN forwards a registration request to an AMF, the registration request may carry a cell ID and the configuration information of the radio resource, or carry a cell ID, a UE ID, and the configuration information of the radio resource. Then, the SMF may obtain the configuration information of the radio resource from the AMF.

Alternatively, during session setup, the RAN may send a cell ID and the corresponding configuration information of the radio resource, or send a cell ID, a UE ID, and the corresponding configuration information of the radio resource to the SMF via an N2 message.

Alternatively, the RAN may provide a network data analytics function (NWDAF) network element with the configuration information that is of the radio resource and that corresponds to a cell, and the SMF may obtain the configuration information of the radio resource and a corresponding cell ID from the NWDAF.

In an example, the SMF may determine, based on a transmission delay from a UPF to the RAN and an estimated moment at which the downlink service packet arrives at the UPF, the estimated moment $t_{RANya}$ at which the downlink service packet arrives at the RAN.

In this specification, the transmission delay from the UPF to the RAN is denoted as $T_{UPF-RAN}$, and the estimated moment at which the downlink service packet arrives at the UPF is denoted as $t_{UPFya}$.

For example, $t_{RANya} = T_{UPF-RAN} + t_{UPFya}$. Alternatively, $t_{RANya} + T_{UPF-RAN} + t_{UPFya} + T_{UPF}$, where $T_{UPF}$ is buffer (or queuing) time of the downlink service packet in the UPF. $T_{UPF}$ may be determined by the SMF or the UPF based on a delay requirement or a service priority in QoS information. However, this is not limited in this application.

In another example, the SMF may obtain QoS information of the downlink service packet (or a downlink service) from a PCF, and determine, based on the QoS information, the estimated moment at which the downlink service packet arrives at the RAN.

Specifically, the QoS information or a Policy and Charging Control (PCC) rule provided by the PCF includes an estimated moment at which the downlink service packet arrives at a UPF. The SMF receives the QoS information or the PCC rule from the PCF, obtains the estimated moment at which the downlink service packet arrives at the UPF, and then determines, based on the estimated moment at which the downlink service packet arrives at the UPF, the estimated moment at which the downlink service packet arrives at the RAN. The QoS information or the PCC rule may further include a periodicity of the downlink service packet and a total quantity of service packets in the periodicity.

Further, that the SMF determines the first delay based on the configuration information of the radio resource and the estimated moment at which the downlink service packet arrives at the RAN may include: The SMF determines, based on the configuration information of the radio resource and the estimated moment at which the downlink service packet arrives at the RAN, an estimated second downlink scheduling window for the RAN to schedule the downlink service packet; the SMF determines a boundary of a third scheduling window based on the second downlink scheduling window, where the third scheduling window is a scheduling window previous to the second downlink scheduling window; and the SMF determines the first delay based on the boundary of the third scheduling window.

The following provides descriptions by using examples with reference to FIG. 5.

Example 1: Assuming that the estimated moment $t_{RANya}$ at which the downlink service packet arrives at the RAN is t1, the SMF may determine, based on the configuration information of the radio resource and t1, that the estimated second downlink scheduling window for the RAN to schedule the downlink service packet is the downlink scheduling window 2. In this case, the expected moment at which the downlink service packet arrives at the RAN is within the third scheduling window, where the third scheduling window is the scheduling window, namely, the downlink scheduling window 1, previous to the second downlink scheduling window. The first delay may be duration T2 between an upper boundary (namely, a boundary that is in two boundaries of the downlink scheduling window 1 and that is nearer to the downlink scheduling window 2) of the downlink scheduling window 1 and t1. Alternatively, the first delay may be any value less than T2. In Example 1, the expected moment at which the downlink service packet arrives at the RAN may be understood as the upper boundary of the downlink scheduling window 1 or any moment between t1 (including t1) and the upper boundary of the downlink scheduling window 1.

Example 2: Assuming that the estimated moment $t_{RANya}$ at which the downlink service packet arrives at the RAN is t2, the SMF may determine, based on the configuration information of the radio resource and t2, that the estimated second downlink scheduling window for the RAN to schedule the downlink service packet is the downlink scheduling window 3. In this case, the expected moment at which the downlink service packet arrives at the RAN is within the third scheduling window, where the third scheduling window is the scheduling window, namely, the uplink scheduling window 1, previous to the second downlink scheduling window. The first delay may be duration T3 between a lower boundary (namely, a boundary that is in two boundaries of the uplink scheduling window 1 and that is nearer to the downlink scheduling window 2) of the uplink scheduling window 1 and t2. Alternatively, the first delay may be duration T4 between an upper boundary (namely, a boundary that is in two boundaries of the uplink scheduling window 2 and that is nearer to the downlink scheduling window 3) of the uplink scheduling window 2 and t2. Alternatively, the first delay may be any value greater than T3 and less than T4. In Example 2, the expected moment at which the downlink service packet arrives at the RAN may be understood as an upper boundary of the uplink scheduling window 1 or any moment between the lower boundary of the uplink scheduling window 1 (including the lower boundary of the uplink scheduling window 1) and the upper boundary of the uplink scheduling window 1.

Example 3: Assuming that the estimated moment $t_{RANya}$ at which the downlink service packet arrives at the RAN is t3, the SMF may determine, based on the configuration information of the radio resource and t3, that the estimated second downlink scheduling window for the RAN to schedule the downlink service packet is the downlink scheduling window 3. In this case, the expected moment at which the downlink service packet arrives at the RAN is within the third scheduling window, where the third scheduling window is the scheduling window, namely, the uplink scheduling window 1, previous to the second downlink scheduling window. The first delay may be duration T5 between a lower boundary of the uplink scheduling window 1 and t3. Alternatively, the first delay may be duration T6 between an upper boundary of the uplink scheduling window 1 and t3. Alternatively, the first delay may be any value greater than T5 and less than T6. In Example 3, the expected moment at which the downlink service packet arrives at the RAN may be understood as the upper boundary of the uplink scheduling window 1 or any moment between the lower boundary of the uplink scheduling window 1 (including the lower boundary of the uplink scheduling window 1) and the upper boundary of the uplink scheduling window 1.

Example 4: Assuming that the estimated moment $t_{RANya}$ at which the downlink service packet arrives at the RAN is t4, the SMF may determine, based on the configuration information of the radio resource and t4, that the estimated second downlink scheduling window for the RAN to schedule the downlink service packet is the downlink scheduling window 3. In this case, the expected moment at which the downlink service packet arrives at the RAN is within the third scheduling window, where the third scheduling window is the scheduling window, namely, the uplink scheduling window 1, previous to the second downlink scheduling window. The first delay may be duration T7 between an upper boundary of the uplink scheduling window 1 and t4. Alternatively, the first delay may be any value less than T7. In Example 4, the expected moment at which the downlink service packet arrives at the RAN may be understood as the upper boundary of the uplink scheduling window 1 or any moment between t4 (including t4) and the upper boundary of the uplink scheduling window 1. In the foregoing examples, the first delay may alternatively be a time range. For example, the first delay in Example 1 may be [0, T2], the first delay in Example 2 may be [T3, T4], the first delay in Example 3 may be [T5, T6], and the first delay in Example 4 may be [0, T7].

Manner 2:

The SMF may obtain the first delay from the RAN. In other words, the RAN may determine the first delay, and send the first delay to the SMF.

For example, the SMF may obtain the estimated moment $t_{RANya}$ at which the downlink service packet arrives at the RAN, and then send, to the RAN, the estimated moment $t_{RANya}$ at which the downlink service packet arrives at the RAN. After receiving the estimated moment $t_{RANya}$ at which the downlink service packet arrives at the RAN, the RAN may determine the first delay based on the estimated moment $t_{RANya}$ at which the downlink service packet arrives at the RAN, and then send the first delay to the SMF.

For example, the RAN may determine the first delay based on the estimated moment $t_{RANya}$ at which the downlink service packet arrives at the RAN and configuration information of a radio resource. For details about how to determine the first delay based on the estimated moment $t_{RANya}$ at which the downlink service packet arrives at the RAN and the configuration information of the radio resource, refer to the foregoing descriptions of determining the first delay by the SMF based on the estimated moment $t_{RANya}$ at which the downlink service packet arrives at the RAN and the configuration information of the radio resource. Details are not described herein again.

In addition, for how the SMF obtains the estimated moment $t_{RANya}$ at which the downlink service packet arrives at the RAN, also refer to the foregoing descriptions of the manner in which the SMF obtains the estimated moment $t_{RANya}$ at which the downlink service packet arrives at the RAN. Details are not described herein again.

Optionally, S601 may be performed only when the estimated moment $t_{RANya}$ at which the downlink service packet arrives at the RAN is in a processing window of the RAN or only when a next slot of a slot in which $t_{RANya}$ is located is an uplink slot. For example, if the estimated moment $t_{RANya}$ at which the downlink service packet arrives at the RAN is t1 or t4, step S601 may not be performed, or in other words, the method 600 is not performed.

S602: The SMF sends time adjustment information related to the first delay to the UPF (that is, an example of a first network element). Accordingly, the UPF receives the time adjustment information from the SMF.

The time adjustment information is denoted as first time adjustment information below. It should be understood that, because the first delay may be a moment, or may be the time range, the first time adjustment information may be a moment, or may be a time range.

The first time adjustment information may be the first delay. Alternatively, the first time adjustment information may be a fourth moment determined based on the first delay and the estimated moment $t_{UPFya}$ at which the downlink service packet arrives at the UPF.

The fourth moment is an expected moment at which the UPF sends the downlink service packet. For example, Fourth moment=$t_{UPFya}$+First delay. Alternatively, Fourth moment=$t_{UPFya}$+First delay+$T_{UPF}$. For a meaning of $T_{UPF}$, refer to the foregoing descriptions. If the first delay is the time range, the SMF may add a specific value in the time range to $t_{UPFya}$ or to $t_{UPFya}$ and $T_{UPF}$, to obtain the fourth moment. Alternatively, the SMF may add the time range to $t_{UPFya}$ or to $t_{UPFya}$ and $T_{UPF}$, to obtain a new time range, where the obtained new time range may be used as the fourth moment, or any moment in the obtained new time range may be used as the fourth moment.

S603: The UPF determines, based on the first time adjustment information, a moment (denoted as a first moment) of sending the downlink service packet.

A moment (denoted as a third moment) at which the downlink service packet sent by the UPF at the first moment arrives at the RAN is within the first scheduling window of the RAN, and the next scheduling window adjacent to the first scheduling window is the downlink scheduling window. In other words, the UPF is to send the downlink service packet at the first moment, so that the downlink service packet may be scheduled in a fourth downlink scheduling window after arriving at the RAN, and the fourth downlink scheduling window is the next scheduling window adjacent to the first scheduling window.

For example, if the first time adjustment information is the first delay, the UPF may determine that the first moment is a sum of the estimated moment $t_{UPFya}$ at which the UPF sends the downlink service packet and the first delay.

For example, if the first time adjustment information is the fourth moment, the UPF may determine that the first moment is the fourth moment, or the first moment is a moment obtained by subtracting $T_{UPF}$ from the fourth moment.

It should be understood that, when the first time adjustment information is the specific moment, the fourth moment is a specific moment. When the first time adjustment information is the time range, the fourth moment may be any value in a new time range obtained according to the foregoing calculation method.

S604: When receiving the downlink service packet, the UPF sends the downlink service packet at the first moment.

Figure 7:
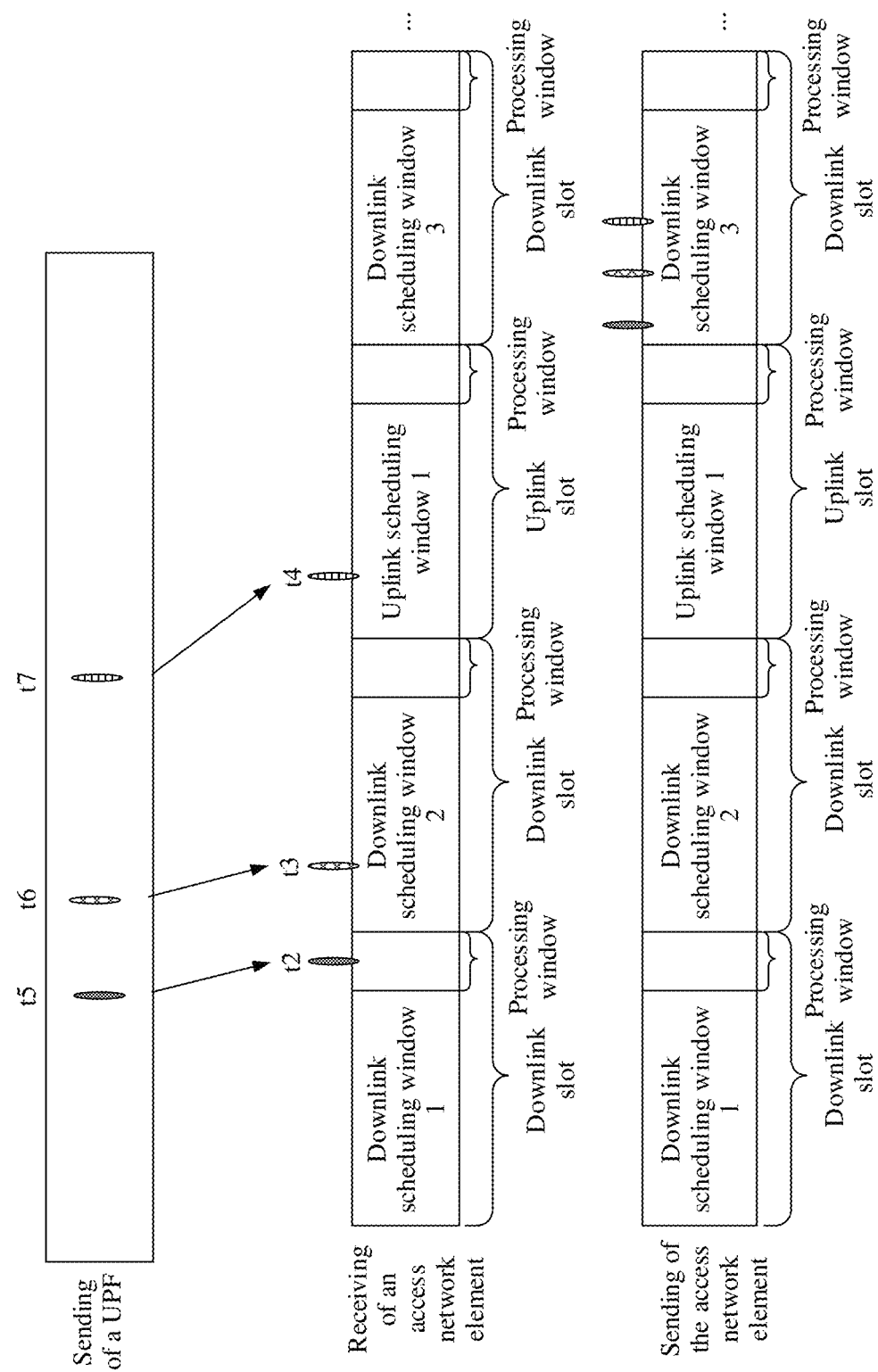
FIG. 7 is a schematic diagram of scheduling a downlink service packet by an access network element according to this application.

Descriptions are provided by using examples with reference to FIG. 7. Refer to FIG. 7. If the UPF sends the downlink service packet at a moment t5 according to an original plan, the moment at which the downlink service packet arrives at the RAN is t2, and the downlink service packet needs to be buffered in at least two slots on a RAN side before being scheduled. That is, the downlink service packet may be first scheduled in a downlink scheduling window 3. If the sending moment of the downlink service packet is adjusted to the first moment, the moment at which the downlink service packet arrives at the RAN is within the first scheduling window of the RAN, so that time for the RAN to buffer the downlink service packet is reduced. For example, if the first moment is t7, the moment t4 at which the downlink service packet arrives at the RAN is within an uplink scheduling window 1 of the RAN, where the uplink scheduling window 1 is a previous scheduling window adjacent to a downlink scheduling window 3, and time for buffering the downlink service packet in the RAN may be reduced by duration of t7-t5. For another example, if the UPF sends the downlink service packet at a moment t6 according to an original plan, the moment at which the downlink service packet arrives at the RAN is t3, and the downlink service packet needs to be buffered in at least one slot on a RAN side before being scheduled. That is, the downlink service packet may be first scheduled in a downlink scheduling window 3. If the sending moment of the downlink service packet is adjusted to the first moment, the moment at which the downlink service packet arrives at the RAN is within the first scheduling window of the RAN, so that time for the RAN to buffer the downlink service packet is reduced. For example, if the first moment is t7, the moment t4 at which the downlink service packet arrives at the RAN is within an uplink scheduling window 1 of the RAN, where the uplink scheduling window 1 is a previous scheduling window adjacent to a downlink scheduling window 3, and time for buffering the downlink service packet in the RAN may be reduced by duration of t7-t6.

Therefore, according to the downlink transmission method provided in this application, the UPF may adjust the sending moment of the downlink service packet based on the time adjustment information provided by the SMF, so that when the UPF sends the downlink service packet at the adjusted sending moment, the moment at which the downlink service packet arrives at the RAN may be within the first scheduling window of the RAN, the downlink service packet may be scheduled in the second downlink scheduling window, and the second downlink scheduling window is the next scheduling window adjacent to the first scheduling window. This helps reduce a scheduling waiting delay of scheduling the downlink service packet by the access network element. Further, the UPF is usually connected to a plurality of RANs, and receives a plurality of downlink service packets. According to the method, the UPF can preferentially process another downlink service packet while buffering the downlink service packets, to properly use a resource, mitigate and avoid a processing conflict between downlink service packets sent to different RANs, improve processing efficiency of the downlink service packets in the UPF, and help guarantee end-to-end delay requirements of the downlink service packets and the another downlink service packet.

Optionally, the method may further include the following steps.

S605: The SMF determines the third moment based on the first time adjustment information.

Specifically, the third moment is the moment at which the downlink service packet arrives at the RAN. For example, Third moment=$t_{RANya}$+First time adjustment information, or Third moment=Fourth moment+$T_{UPF-RAN}$. Alternatively, the third moment is the same as the expected moment $t_{RAN}yt$ at which the downlink service packet arrives at the RAN. For meanings of $t_{RANya}$ and $T_{UPF-RAN}$, refer to the foregoing descriptions.

Because the first time adjustment information may be the moment, or may be the time range, the third moment may be a moment, or may be a time range.

S606: The SMF sends the third moment to the RAN, where the third moment is used by the RAN to schedule the downlink service packet.

Specifically, after receiving the third moment that is related to the downlink service packet and that is sent by the SMF, the RAN may determine, based on the third moment, the moment at which the downlink service packet arrives at the RAN. After determining the moment at which the downlink service packet arrives at the RAN, the RAN may schedule the downlink service packet based on the moment. For example, the RAN may perform semi-persistent scheduling on the downlink service packet based on the periodicity of the downlink service packet and the moment at which the downlink service packet arrives at the RAN, that is, allocate, to the downlink service packet once, a same time-frequency resource that can be periodically and repeatedly used, to reduce an end-to-end transmission delay of the downlink service packet and save a control plane resource.

Figure 8:
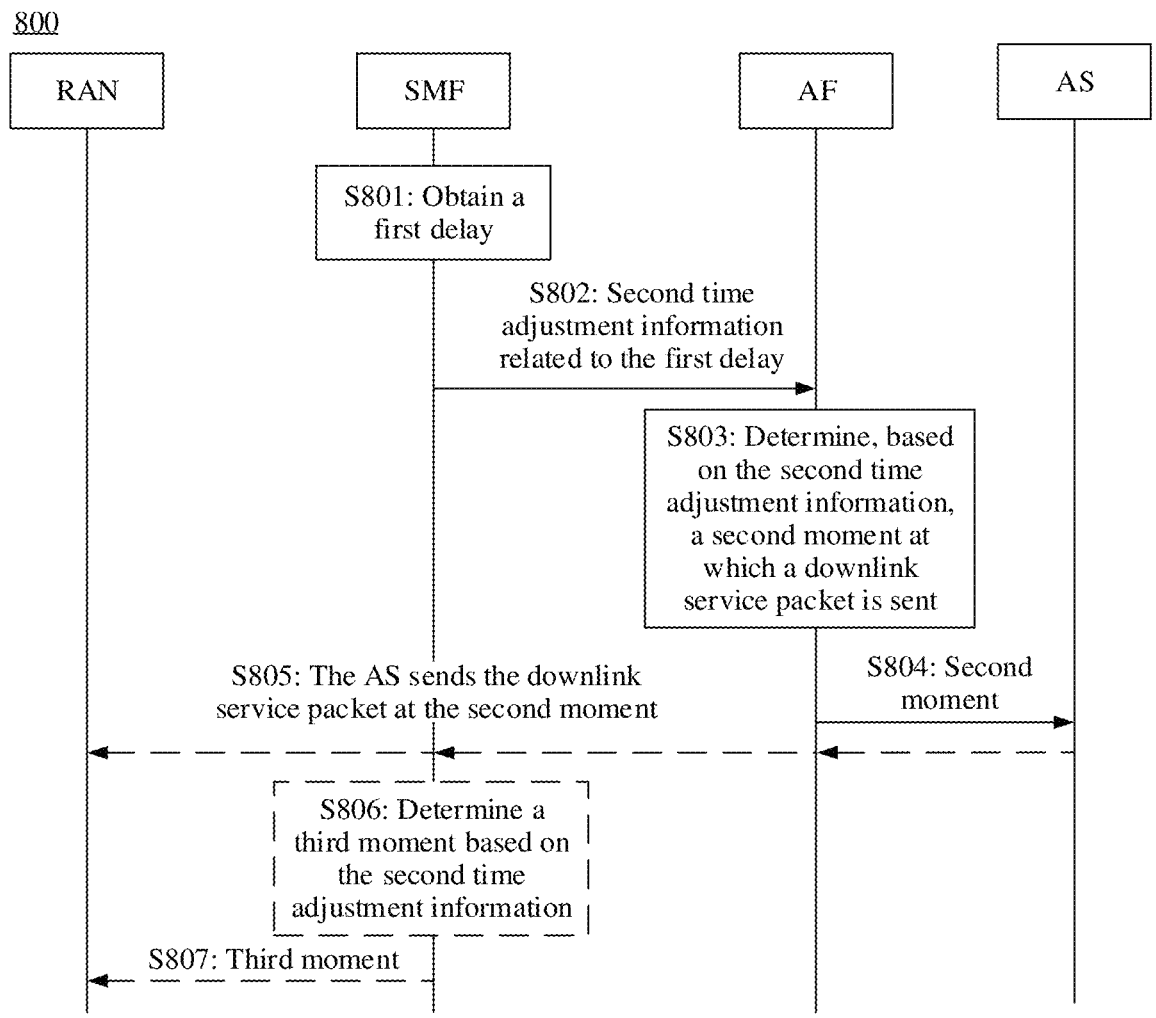
FIG. 8 is a schematic flowchart of a downlink transmission method according to this application.

FIG. 8 is an example flowchart of another downlink transmission method according to this application. The method 800 shown in FIG. 8 is described below.

S801: An SMF obtains a first delay.

The first delay is duration between an expected moment at which a downlink service packet arrives at a RAN and an estimated moment at which the downlink service packet arrives at the RAN, where the expected moment at which the downlink service packet arrives at the RAN is within a first scheduling window, and a next scheduling window adjacent to the first scheduling window is a downlink scheduling window. "Estimated" may be understood as "originally planned" instead of actually occurring.

In this specification, the expected moment at which the downlink service packet arrives at the RAN is denoted as $t_{RANyt}$, and the estimated moment at which the downlink service packet arrives at the RAN is denoted as $t_{RANya}$.

In this case, First delay=$t_{RANyt}$-$t_{RANya}$.

For example, assuming that $t_{RANyt}$ is 10:30 and $t_{RANya}$ is 10:29, the first delay is 1 min.

The following describes two manners in which the SMF obtains the first delay.

Manner 1:

The first delay obtained by the SMF is determined by the SMF.

Optionally, the SMF may obtain configuration information of a radio resource of the RAN and the estimated moment $t_{RANya}$ at which the downlink service packet arrives at the RAN, and determine the first delay based on the configuration information of the radio resource and the estimated moment $t_{RANya}$ at which the downlink service packet arrives at the RAN.

For example, the configuration information of the radio resource may include information, for example, a slot start moment, slot duration, or a quantity of symbols in a slot, that can be for estimating the slot duration, an uplink-downlink slot configuration, and a scheduling processing delay of the RAN.

For example, the RAN may report the configuration information of the radio resource and a corresponding cell ID to an AMF in an NG setup process, and the SMF may obtain the configuration information of the radio resource and the cell ID from the AMF. The NG setup process may also be referred to as an N2 setup process, and an interface between the RAN and the AMF is referred to as an NG interface.

Alternatively, in a registration process of UE, when the RAN forwards a registration request to an AMF, the registration request may carry a cell ID and the configuration information of the radio resource, or carry a cell ID, a UE ID, and the configuration information of the radio resource. Then, the SMF may obtain the configuration information of the radio resource from the AMF.

Alternatively, during session setup, the RAN may send a cell ID and the corresponding configuration information of the radio resource, or send a cell ID, a UE ID, and the corresponding configuration information of the radio resource to the SMF via an N2 message.

Alternatively, the RAN may provide a NWDAF network element with the configuration information that is of the radio resource and that corresponds to a cell, and the SMF may obtain the configuration information of the radio resource and a corresponding cell ID from the NWDAF.

In an example, the SMF may determine, based on a transmission delay from a UPF to the RAN and an estimated moment at which the downlink service packet arrives at the UPF, the estimated moment $t_{RANya}$ at which the downlink service packet arrives at the RAN.

In this specification, the transmission delay from the UPF to the RAN is denoted as $T_{UPF-RAN}$, and the estimated moment at which the downlink service packet arrives at the UPF is denoted as $t_{UPFya}$.

For example, $t_{RANya}=T_{UPF-RAN}+t_{UPFya}$. Alternatively, $t_{RANya}=T_{UPF-RAN}+t_{UPFya}+T_{UPF}$, where $T_{UPF}$ is buffer (or queuing) time of the downlink service packet in the UPF. $T_{UPF}$ may be determined by the SMF or the UPF based on a delay requirement or a service priority in QoS information. However, this is not limited in this application.

In another example, the SMF may obtain QoS information of the downlink service packet (or a downlink service) from a PCF, and determine, based on the QoS information, the estimated moment at which the downlink service packet arrives at the RAN.

Specifically, the QoS information or a PCC rule provided by the PCF includes an estimated moment at which the downlink service packet arrives at a UPF. The SMF receives the QoS information or the PCC rule from the PCF, obtains the estimated moment at which the downlink service packet arrives at the UPF, and then determines, based on the estimated moment at which the downlink service packet arrives at the UPF, the estimated moment at which the downlink service packet arrives at the RAN. The QoS information or the PCC rule may further include a periodicity of the downlink service packet and a burst size in the periodicity.

Further, that the SMF determines the first delay based on the configuration information of the radio resource and the estimated moment at which the downlink service packet arrives at the RAN may include: The SMF determines, based on the configuration information of the radio resource and the estimated moment at which the downlink service packet arrives at the RAN, an estimated second downlink scheduling window for the RAN to schedule the downlink service packet; the SMF determines a boundary of a third scheduling window based on the second downlink scheduling window, where the third scheduling window is a scheduling window previous to the second downlink scheduling window; and the SMF determines the first delay based on the boundary of the third scheduling window.

For specific examples, refer to Example 1 to Example 4 in step S601.

In addition, that the SMF determines the first delay based on the configuration information of the radio resource and the estimated moment at which the downlink service packet arrives at the RAN may include: The SMF determines, based on the configuration information of the radio resource and the estimated moment at which the downlink service packet arrives at the RAN, an estimated second downlink scheduling window for the RAN to schedule the downlink service packet; the SMF determines a boundary of a fifth scheduling window based on the second downlink scheduling window, where the fifth scheduling window is an expected window in which the RAN schedules the downlink service packet, and the fifth scheduling window is a downlink scheduling window previous to the second downlink scheduling window; the SMF determines a sixth scheduling window based on the boundary of the fifth scheduling window, where the sixth scheduling window is a scheduling window in which the expected moment at which the downlink service packet arrives at the RAN is located; and the AMF determines the first delay based on a boundary of the sixth scheduling window.

It should be understood that, the expected moment at which the downlink service packet arrives at the RAN and that is determined according to the method is earlier than or equal to the estimated moment at which the downlink service packet arrives at the RAN.

The following provides descriptions by using examples with reference to FIG. 5.

Example 5: Assuming that the estimated moment $t_{RANya}$ at which the downlink service packet arrives at the RAN is t2, the SMF may determine, based on the configuration information of the radio resource and t2, that the estimated second downlink scheduling window for the RAN to schedule the downlink service packet is the downlink scheduling window 3. In this case, the expected window for the RAN to schedule the downlink service packet is the fifth scheduling window, where the fifth scheduling window is the downlink scheduling window, namely, the downlink scheduling window 2, previous to the second downlink scheduling window, and the sixth scheduling window is the downlink scheduling window 1. Therefore, the first delay may be duration T3' between a lower boundary (namely a boundary that is in two boundaries of the downlink scheduling window 1 and that is farther from the downlink scheduling window 2) of the downlink scheduling window 1 and t2. Alternatively, the first delay may be duration T4' between an upper boundary (namely a boundary that is in two boundaries of the downlink scheduling window 1 and that is nearer to the downlink scheduling window 2) of the downlink scheduling window 1 and t2. Alternatively, the first delay may be any value greater than T4' and less than T3'. In Example 5, the expected moment at which the downlink service packet arrives at the RAN may be understood as the upper boundary of the downlink scheduling window 1 or any moment between a lower boundary of the uplink scheduling window 1 (including the lower boundary of the uplink scheduling window 1) and an upper boundary of the uplink scheduling window 1.

Example 6: Assuming that the estimated moment $t_{RANya}$ at which the downlink service packet arrives at the RAN is t3, the SMF may determine, based on the configuration information of the radio resource and t3, that the estimated second downlink scheduling window for the RAN to schedule the downlink service packet is the downlink scheduling window 3. In this case, the expected window for the RAN to schedule the downlink service packet is the fifth scheduling window, where the fifth scheduling window is the downlink scheduling window, namely, the downlink scheduling window 2, previous to the second downlink scheduling window, and the sixth scheduling window is the downlink scheduling window 1. Therefore, the first delay may be duration T5' between a lower boundary of the downlink scheduling window 1 and t3. Alternatively, the first delay may be duration T6' between an upper boundary of the downlink scheduling window 1 and t3. Alternatively, the first delay may be any value greater than T6' and less than T5'. In Example 6, the expected moment at which the downlink service packet arrives at the RAN may be understood as an upper boundary of the uplink scheduling window 1 or any moment between a lower boundary of the uplink scheduling window 1 (including the lower boundary of the uplink scheduling window 1) and the upper boundary of the uplink scheduling window 1.

In the foregoing examples, the first delay may be a time range. For example, the first delay in Example 5 may be [T4', T3'], and the first delay in Example 6 may be [T6', T5'].

Manner 2:

The SMF may obtain the first delay from the RAN. In other words, the RAN may determine the first delay, and send the first delay to the SMF.

For example, the SMF may obtain the estimated moment $t_{RANya}$ at which the downlink service packet arrives at the RAN, and then send, to the RAN, the estimated moment $t_{RANya}$ at which the downlink service packet arrives at the RAN. After receiving the estimated moment $t_{RANya}$ at which the downlink service packet arrives at the RAN, the RAN may determine the first delay based on the estimated moment $t_{RANya}$ at which the downlink service packet arrives at the RAN, and then send the first delay to the SMF.

For example, the RAN may determine the first delay based on the estimated moment $t_{RANya}$ at which the downlink service packet arrives at the RAN and configuration information of a radio resource. For details about how to determine the first delay based on the estimated moment $t_{RANya}$ at which the downlink service packet arrives at the RAN and the configuration information of the radio resource, refer to the foregoing descriptions of determining the first delay by the SMF based on the estimated moment $t_{RANya}$ at which the downlink service packet arrives at the RAN and the configuration information of the radio resource. Details are not described herein again.

In addition, for how the SMF obtains the estimated moment $t_{RANya}$ at which the downlink service packet arrives at the RAN, also refer to the foregoing descriptions of the manner in which the SMF obtains the estimated moment $t_{RANya}$ at which the downlink service packet arrives at the RAN. Details are not described herein again.

Optionally, S801 may be performed only when the estimated moment $t_{RANya}$ at which the downlink service packet arrives at the RAN is in a processing window of the RAN or only when a next slot of a slot in which $t_{RANya}$ is located is an uplink slot. For example, if the estimated moment $t_{RANya}$ at which the downlink service packet arrives at the RAN is t1 or t4, step S801 may not be performed, or in other words, the method 800 is not performed.

S802: The SMF sends time adjustment information related to the first delay to an AF (that is, another example of a first network element). Accordingly, the AF receives the time adjustment information from the SMF.

The time adjustment information is denoted as second time adjustment information below.

Optionally, the second time adjustment information may include one or more of the following: the first delay, an expected moment that is determined based on the first delay and at which the downlink service packet arrives at the UPF, and an expected moment that is determined based on the first delay and at which the downlink service packet arrives at the UE.

For example, if the second time adjustment information is the first delay, the SMF may indicate to the AF whether the first delay is an advance or retardation. For example, if the first delay is determined based on the boundary of the third scheduling window, the first delay is the retardation; or if the first delay is determined based on the boundary of the sixth scheduling window, the first delay is the advance. If the first delay is the advance, sending time that is of the downlink service packet and that is determined by the AF is earlier than estimated sending time by the first delay; or if the first delay is the retardation, sending time that is of the downlink service packet and that is determined by the AF is later than estimated sending time by the first delay.

Optionally, the SMF may provide an additional indication for the AF only when the first delay is the retardation. When there is no additional indication, the first delay is the advance.

Optionally, the SMF may alternatively provide both the first delay that is the advance and the first delay that is the retardation for the AF to select.

It should be understood that, if the second time adjustment information is not the first delay, or further includes an item other than the first delay in the foregoing items, the SMF first determines the second time adjustment information or the item other than the first delay in the foregoing items based on the first delay, and then sends the determined information to the AF.

For example, the expected moment at which the downlink service packet arrives at the UPF may be a sum of or a difference between the estimated time at which the downlink service packet arrives at the UPF and the first delay. For example, if the first delay is determined based on the boundary of the third scheduling window, the expected moment at which the downlink service packet arrives at the UPF may be the sum of the estimated time at which the downlink service packet arrives at the UPF and the first delay; or if the first delay is determined based on the boundary of the sixth scheduling window, the expected moment at which the downlink service packet arrives at the UPF may be the difference between the estimated time at which the downlink service packet arrives at the UPF and the first delay.

The expected moment at which the downlink service packet arrives at the UE may be a sum of or a difference between estimated time at which the downlink service packet arrives at the UE and the first delay. For example, if the first delay is determined based on the boundary of the third scheduling window, the expected moment at which the downlink service packet arrives at the UE may be the sum of the estimated time at which the downlink service packet arrives at the UE and the first delay; or if the first delay is determined based on the boundary of the sixth scheduling window, the expected moment at which the downlink service packet arrives at the UPF may be the difference between the estimated time at which the downlink service packet arrives at the UE and the first delay.

The first delay may be the time range, and the second time adjustment information is determined based on the first delay. Therefore, the second time adjustment information may be a moment, or may be a time range. When the first delay is the time range, the second time adjustment information may be a time range determined by the SMF based on the first delay. Alternatively, the SMF may determine a time range based on the first delay, and then determine a moment within the time range as the second time adjustment information based on the time range.

S803: The AF determines, based on the second time adjustment information, a second moment at which an AS sends the downlink service packet.

A third moment at which the downlink service packet sent at the second moment arrives at the RAN is within the first scheduling window of the RAN, and the next scheduling window adjacent to the first scheduling window is the downlink scheduling window. In other words, the AS is to send the downlink service packet at the second moment, so that the downlink service packet may be scheduled in a fourth downlink scheduling window after arriving at the RAN, and the fourth downlink scheduling window is the next scheduling window adjacent to the first scheduling window.

For example, if the second time adjustment information is the first delay, the AF may determine that the second moment is a sum of or a difference between an estimated moment $t_{ASya}$ at which the AS sends the downlink service packet and the first delay. Specifically, if the first delay is the advance, the second moment is the difference between the estimated moment $t_{ASya}$ at which the AS sends the downlink service packet and the first delay; or if the first delay is the retardation, the second moment is a sum of the estimated moment $t_{ASya}$ at which the AS sends the downlink service packet and the first delay.

For example, if the second time adjustment information is the expected moment at which the downlink service packet arrives at the UPF, the AF may determine the second moment based on a difference between the estimated moment $t_{UPFya}$ at which the downlink service packet arrives at the UPF and the expected moment $t_{UPFqa}$ at which the downlink service packet arrives at the UPF. Specifically, Second moment=$t_{ASys}+t_{UPFqa}-t_{UPFya}$, where $t_{ASys}$ is the estimated moment at which the AS sends the downlink service packet.

For example, if the second time adjustment information is the expected moment at which the downlink service packet arrives at the UE, the AF may determine the second moment based on a difference between the estimated moment $t_{UEya}$ at which the downlink service packet arrives at the UE and the expected moment $t_{UEqa}$ at which the downlink service packet arrives at the UPF. Specifically, Second moment=$t_{ASys}+t_{UEqa}-t_{UEya}$, where $t_{ASys}$ is the estimated moment at which the AS sends the downlink service packet.

If the second time adjustment information is the time range, the AF may first determine a specific moment within the time range based on the time range, and then determine the second moment based on the specific moment. Alternatively, the AF may directly determine a time range based on the second time adjustment information, and the AF further determines the second moment within the time range based on the time range.

S804: The AF sends the second moment to the AS.

S805: The AS sends the downlink service packet at the second moment.

Figure 9:
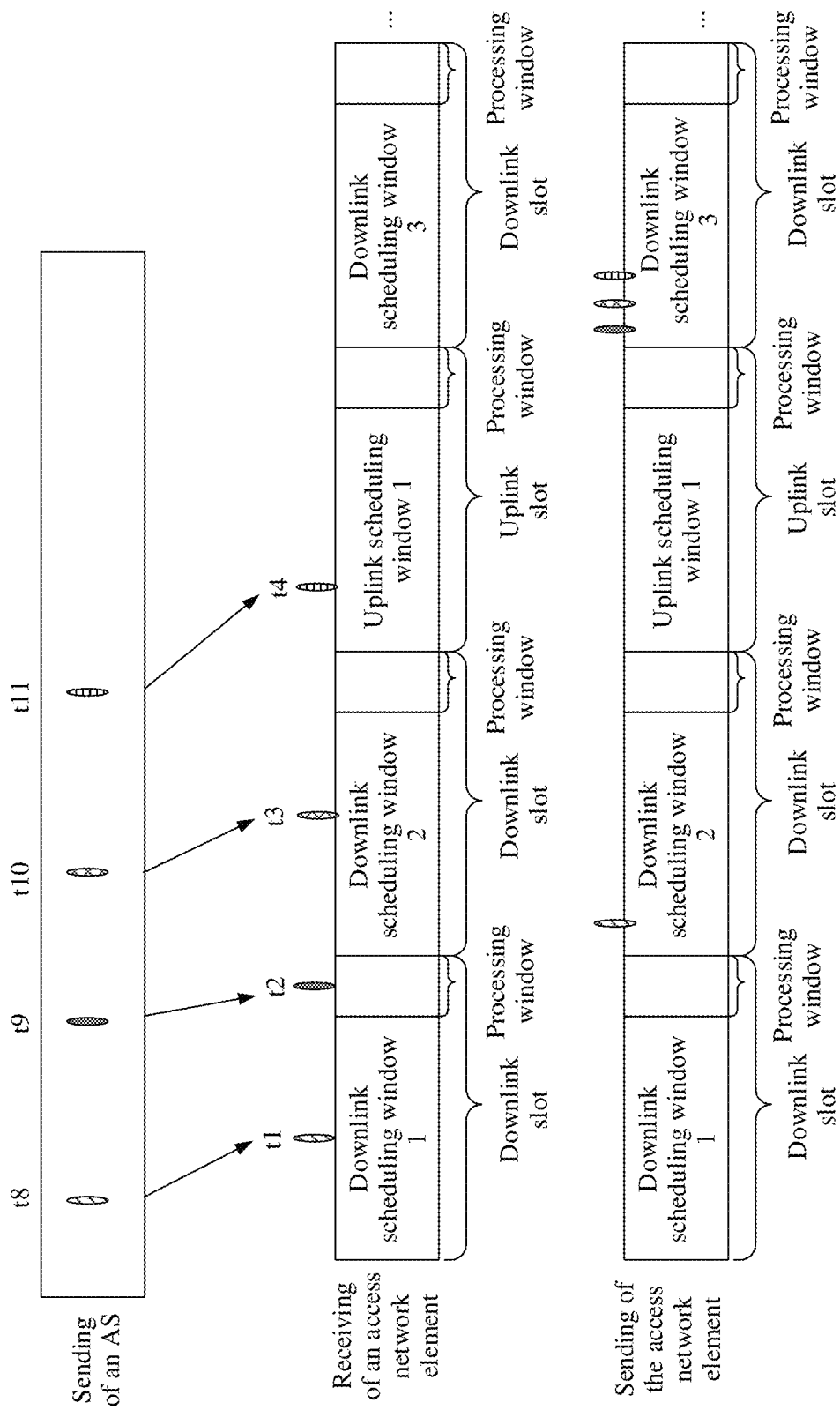
FIG. 9 is a schematic diagram of scheduling a downlink service packet by an application server and an access network element according to this application.

Descriptions are provided by using examples with reference to FIG. 9. Refer to FIG. 9. If the AS sends the downlink service packet at a moment t9, a moment at which the downlink service packet arrives at the RAN is t2, and the downlink service packet needs to be buffered in at least two slots on a RAN side before being scheduled. That is, the downlink service packet may be first scheduled in a downlink scheduling window 3. If the sending moment of the downlink service packet is adjusted to the second moment, a moment at which the downlink service packet arrives at the RAN is within the first scheduling window of the RAN, so that time for the RAN to buffer the downlink service packet is reduced. For example, if the second moment is t11, the moment at which the downlink service packet arrives at the RAN is within an uplink scheduling window 1 of the RAN, the uplink scheduling window 1 is a previous scheduling window adjacent to a downlink scheduling window 3, and the time for buffering the downlink service packet may be reduced by duration of t11-t9. For another example, if the second moment is t8, the moment at which the downlink service packet arrives at the RAN is within a downlink scheduling window 1 of the RAN, the downlink service packet can be scheduled in a downlink scheduling window 2 by buffering one slot, and the time for buffering the downlink service packet may be reduced by one slot.

For another example, if the AS sends the downlink service packet at a moment t10, a moment at which the downlink service packet arrives at the RAN is t3, and the downlink service packet needs to be buffered in at least one slot on a RAN side before being scheduled. That is, the downlink service packet may be first scheduled in a downlink scheduling window 3. If the sending moment of the downlink service packet is adjusted to the second moment, a moment at which the downlink service packet arrives at the RAN is within the first scheduling window of the RAN, so that time for the RAN to buffer the downlink service packet is reduced. For example, if the second moment is t11, the moment at which the downlink service packet arrives at the RAN is within an uplink scheduling window 1 of the RAN, the uplink scheduling window 1 is a previous scheduling window adjacent to a downlink scheduling window 3, and the time for buffering the downlink service packet may be reduced by duration of t11-t10. For another example, if the second moment is t8, the moment at which the downlink service packet arrives at the RAN is within a downlink scheduling window 1 of the RAN, the downlink service packet can be scheduled in a downlink scheduling window 2 by buffering one slot, and the time for buffering the downlink service packet may be reduced by one slot.

Therefore, according to the downlink transmission method provided in this application, the AF may adjust, based on the time adjustment information provided by the SMF, the moment at which the AS sends the downlink service packet, so that when the AS sends the downlink service packet at the adjusted sending moment, the moment at which the downlink service packet arrives at the RAN may be within the first scheduling window of the RAN, the downlink service packet may be scheduled in the second downlink scheduling window, and the second downlink scheduling window is the next scheduling window adjacent to the first scheduling window. This helps reduce a scheduling waiting delay of scheduling the downlink service by an access network element, and helps guarantee an end-to-end delay of the downlink service packet. Further, the AS usually receives a plurality of downlink service packets for a plurality of RANs. According to the method, the AS can preferentially process another downlink service packet while buffering the downlink service packets, to properly use a resource, mitigate and avoid a processing conflict between downlink service packets sent to different RAN nodes, improve processing efficiency of the downlink service packets in the AS, and help guarantee end-to-end delay requirements of the downlink service packets and the another downlink service packet.

Optionally, the method 800 may further include the following steps.

S806: The SMF determines the third moment based on the second time adjustment information.

The third moment is the moment at which the downlink service packet arrives at the RAN.

For example, if the second time adjustment information is the first delay, and the first delay is the advance, Third moment=$t_{RANya}$−Second time adjustment information.

If the second time adjustment information is the first delay, and the first delay is the retardation, Third moment=$t_{RANya}$+Second time adjustment information.

If the second time adjustment information is the expected moment $t_{UPFya}$ at which the downlink service packet arrives at the UPF, Third moment=$t_{UPFya}$+$T_{UPF-RAN}$.

If the second time adjustment information is the expected moment $t_{UPFya}$ at which the downlink service packet arrives at the UE, Third moment=$t_{UEya}$+$T_{UE-RAN}$.

For meanings of $t_{RANya}$ and $T_{UPF-RAN}$, refer to the foregoing descriptions. $T_{UE-RAN}$ is a transmission delay between the UE and the RAN. Because the second time adjustment information may be the moment, or may be the time range, the third moment may also be a time range.

S807: The SMF sends the third moment to the RAN, where the third moment is used by the RAN to schedule the downlink service packet.

Step S807 is the same as step S606. For details, refer to the foregoing descriptions of step S606. Details are not described herein again.

It should be noted that the method 600 and the method 800 may be used separately, or may be used in combination.

Figure 10:
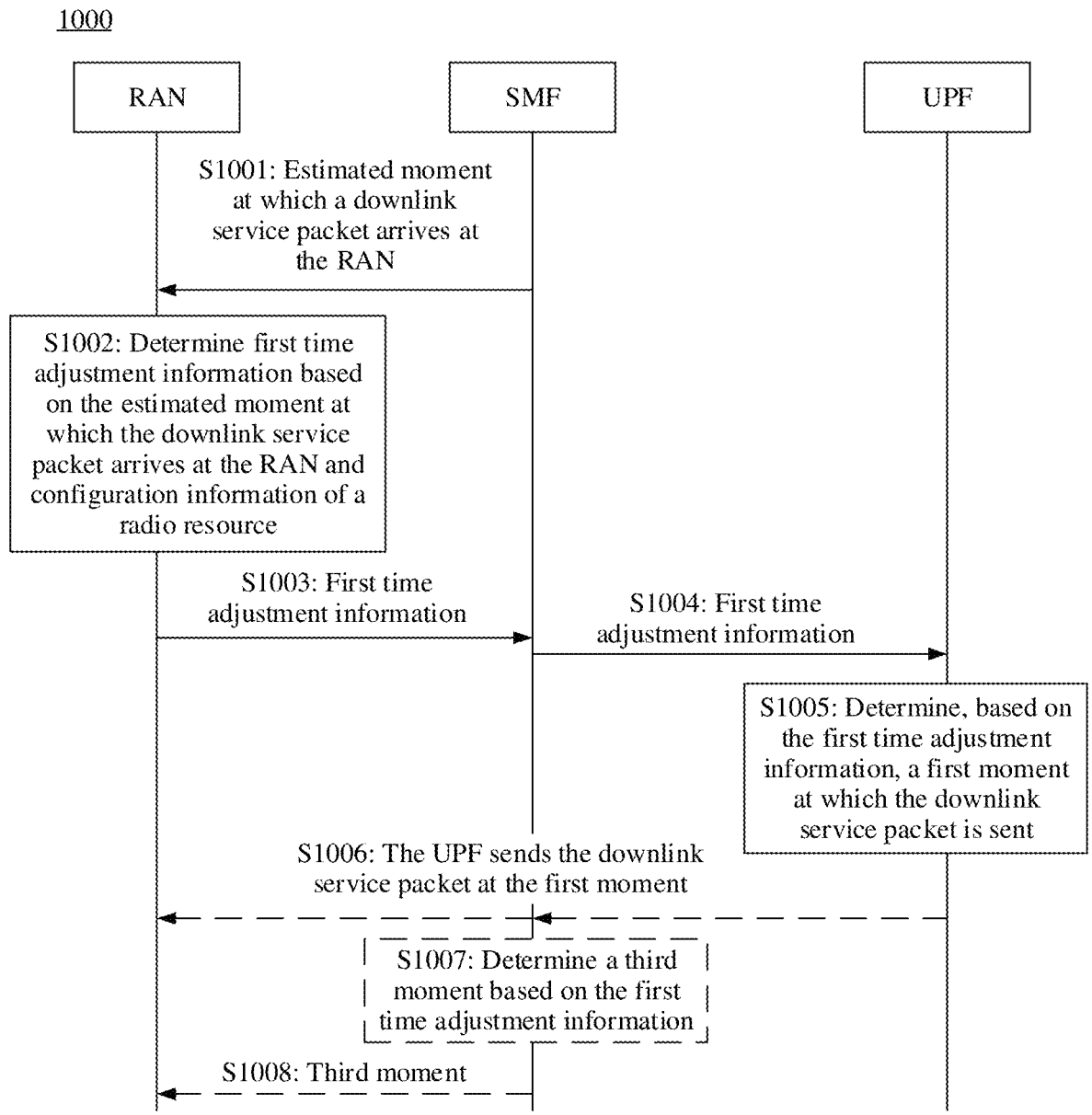
FIG. 10 is a schematic flowchart of a downlink transmission method according to this application.

FIG. 10 shows another downlink transmission method according to this application. The following describes the method 1000.

S1001: An SMF sends, to a RAN, an estimated moment at which a downlink service packet arrives at the RAN. Accordingly, the RAN receives, from the SMF, the estimated moment at which the downlink service packet arrives at the RAN.

Before the SMF sends, to the RAN, the estimated moment at which the downlink service packet arrives at the RAN, the SMF first needs to determine the estimated moment at which the downlink service packet arrives at the RAN. For a manner in which the SMF determines the estimated moment at which the downlink service packet arrives at the RAN, refer to the descriptions in step S601 in the method 600. Details are not described herein again.

S1002: The RAN determines first time adjustment information based on the estimated moment at which the downlink service packet arrives at the RAN and configuration information of a radio resource.

Optionally, in a manner, the RAN may determine a first delay based on the estimated moment at which the downlink service packet arrives at the RAN and the configuration information of the radio resource, where the first delay is duration between a moment that is expected by the RAN and at which the downlink service packet arrives at the RAN and the estimated moment at which the downlink service packet arrives at the RAN, the moment that is expected by the RAN and at which the downlink service packet arrives at the RAN is within a first scheduling window, and a next scheduling window adjacent to the first scheduling window is a downlink scheduling window. Then, the RAN determines the first time adjustment information based on the first delay.

A manner in which the RAN determines the first delay is similar to the manner in which the SMF determines the first delay in step S601. For details, refer to S601. Details are not described herein again.

The RAN determines the first time adjustment information based on the first delay, where the first time adjustment information may be the first delay. Alternatively, the first time adjustment information may be a fifth moment determined based on the first delay and the estimated moment $t_{RANya}$ at which the downlink service packet arrives at the RAN, where the fifth moment is an expected moment at which a UPF sends the downlink service packet. For example, Fifth moment=$t_{RANya}$+First delay+$T_{UPF-RAN}$. Alternatively, the first time adjustment information may be a fifth moment determined based on the first delay and an estimated moment $t_{UPFya}$ at which the downlink service packet arrives at a UPF, where the fifth moment is an expected moment at which the UPF sends the downlink service packet. For example, Fifth moment=$t_{UPFya}$+First delay. In this case, the RAN needs to obtain $t_{UPFya}$ from the SMF. Specifically, in step S1001, the SMF sends $t_{UPFya}$ to the RAN.

In another manner, the RAN may determine, based on the estimated moment at which the downlink service packet arrives at the RAN and the configuration information of the radio resource, an estimated second downlink scheduling window for the RAN to schedule the downlink service packet. Then, the RAN determines a boundary of a third scheduling window based on the second downlink scheduling window, where the third scheduling window is a scheduling window previous to the second downlink scheduling window. Finally, the RAN determines the first time adjustment information based on the boundary of the third scheduling window.

For how the RAN determines, based on the estimated moment at which the downlink service packet arrives at the RAN and the configuration information of the radio resource, the estimated second downlink scheduling window for the RAN to schedule the downlink service packet, and determines the boundary of the third scheduling window based on the second downlink scheduling window, refer to the descriptions, in step S601, of that the SMF determines, based on the estimated moment at which the downlink service packet arrives at the RAN and the configuration information of the radio resource, the estimated second downlink scheduling window for the RAN to schedule the downlink service packet, and determines the boundary of the third scheduling window based on the second downlink scheduling window. Details are not described herein again.

After determining the boundary of the third scheduling window, the RAN may determine the first time adjustment information. For example, the RAN may first determine a first delay based on the boundary of the third scheduling window, and then determine the first time adjustment information based on the first delay. For this, refer to the descriptions, in step S601, of that the SMF determines the first delay based on the boundary of the third scheduling window. For another example, the RAN may directly determine the first time adjustment information based on the boundary of the third scheduling window. For example, refer to FIG. 5. Assuming that the estimated moment $t_{RANya}$ at which the downlink service packet arrives at the RAN is t1, the RAN may determine, based on the configuration information of the radio resource and t1, that the estimated second downlink scheduling window for the RAN to schedule the downlink service packet is the downlink scheduling window 2. In this case, an expected moment at which the downlink service packet arrives at the RAN is within the third scheduling window, where the third scheduling window is the scheduling window, namely, the downlink scheduling window 1, previous to the second downlink scheduling window. The first time adjustment information may be the first delay, the first time adjustment information may be a sum of duration T2 (namely, the first delay) between an upper boundary of the downlink scheduling window 1 and t1 and $t_{UPFya}$, or the first time adjustment information may be a sum of $t_{RANya}$, the first delay, and $T_{UPF-RAN}$. For meanings of $t_{UPFya}$ and $T_{UPF}$, refer to the foregoing descriptions. Assuming that the estimated moment $t_{RANya}$ at which the downlink service packet arrives at the RAN is t2, the SMF may determine, based on the configuration information of the radio resource and t2, that the estimated second downlink scheduling window for the RAN to schedule the downlink service packet is the downlink scheduling window 3. In this case, an expected moment at which the downlink service packet arrives at the RAN is within the third scheduling window, where the third scheduling window is the scheduling window, namely, the uplink scheduling window 1, previous to the second downlink scheduling window. The first time adjustment information may be the first delay, the first time adjustment information may be a sum of [T3, T4] and $t_{UPFya}$, or the first time adjustment information may be a sum of [T3, T4], $t_{RANya}$, and $T_{UPF-RAN}$, where T3 is duration between a lower boundary of the uplink scheduling window 1 and t2, and T4 is duration between an upper boundary of an uplink scheduling window 2 and t2.

The first delay may be a time range, and the first time adjustment information is determined based on the first delay. Therefore, the first time adjustment information may be a moment, or may be a time range. When the first delay is the time range, the first time adjustment information may be a time range determined by the RAN based on the first delay. Alternatively, the RAN may determine a time range based on the first delay, and then determine a moment within the time range as the first time adjustment information based on the time range.

S1003: The RAN sends the first time adjustment information to the SMF.

S1004 to S1006: The SMF sends the first time adjustment information to the UPF, and the UPF determines, based on the first time adjustment information, a first moment at which the downlink service packet is sent, and sends the downlink service packet at the first moment.

Steps S1004 to S1006 are the same as steps S602 to S604. For details, refer to the descriptions of S602 to S604. Details are not described herein again.

Optionally, the method may further include S1007 and S1008. S1007 and S1008 are the same as S605 and S606. For details, refer to the descriptions of S605 and S606. Details are not described herein again.

According to the downlink transmission method provided in this application, the RAN may determine the time adjustment information based on the estimated moment at which the downlink service packet arrives at the RAN and the configuration information of the radio resource, and may provide the time adjustment information for the SMF. The SMF may adjust, based on the time adjustment information, the moment at which the UPF sends the downlink service packet, so that the UPF may send the downlink service packet at the adjusted moment. In this way, the moment at which the downlink service packet arrives at the RAN may be within the first scheduling window of the RAN, the downlink service packet may be scheduled in the second downlink scheduling window, and the second downlink scheduling window is the next scheduling window adjacent to the first scheduling window. This helps reduce a scheduling waiting delay of scheduling the downlink service by the access network element, and helps guarantee an end-to-end delay requirement of the downlink service packet.

Figure 11:
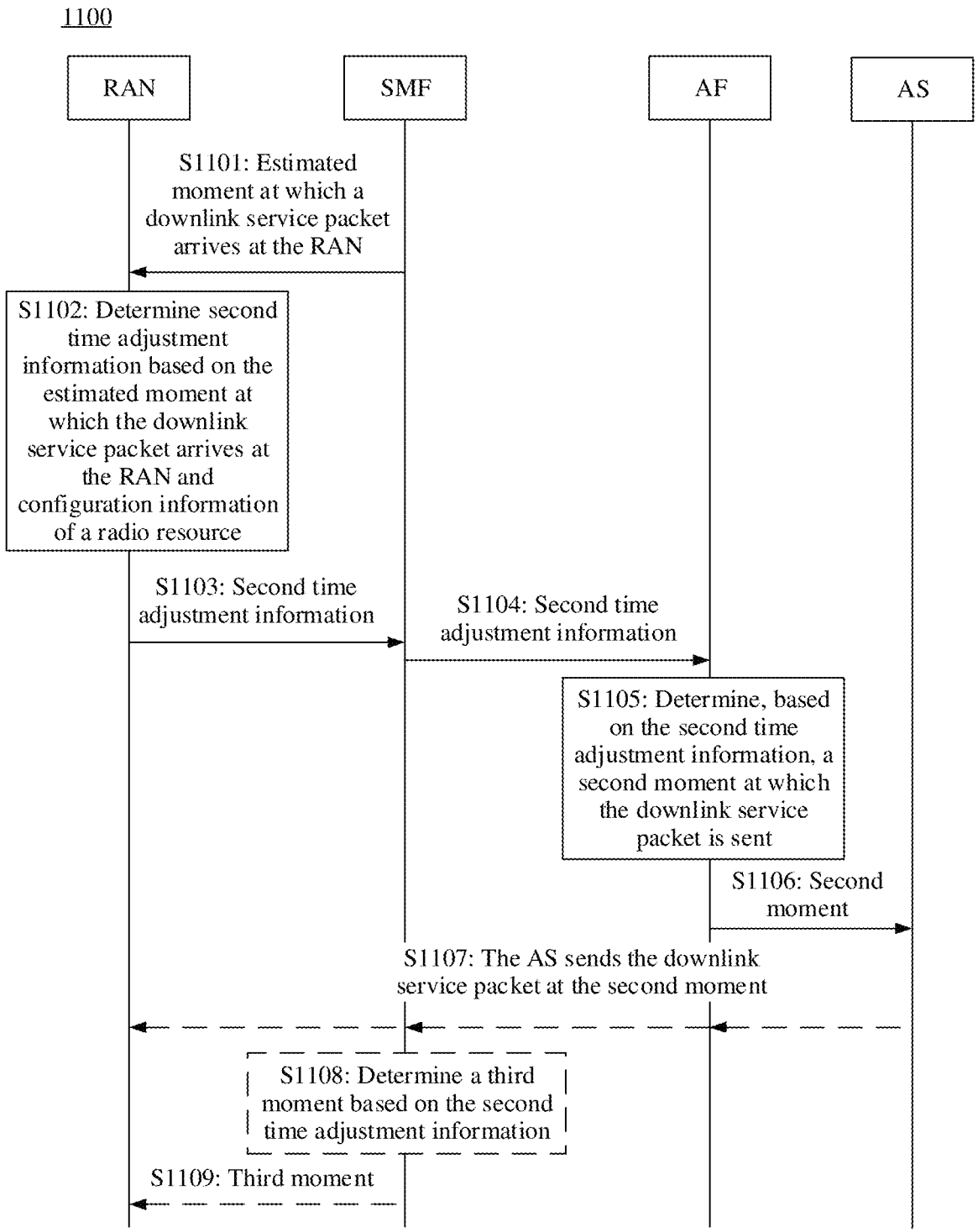
FIG. 11 is a schematic flowchart of a downlink transmission method according to this application.

FIG. 11 shows another downlink transmission method according to this application. The following describes the method 1100.

S101: An SMF sends, to a RAN, an estimated moment at which a downlink service packet arrives at the RAN. Accordingly, the RAN receives, from the SMF, the estimated moment at which the downlink service packet arrives at the RAN.

This step is the same as S1001. Refer to the foregoing descriptions of S1001. Details are not described herein again.

S1102: The RAN determines second time adjustment information based on the estimated moment at which the downlink service packet arrives at the RAN and configuration information of a radio resource.

For example, the RAN may determine a first delay based on the estimated moment at which the downlink service packet arrives at the RAN and the configuration information of the radio resource, and then determine the second time adjustment information based on the first delay. For how to determine the first delay, refer to the foregoing descriptions in step S801. Details are not described herein again.

The RAN determines the second time adjustment information based on the first delay, where the second time adjustment information may be the first delay.

For example, if the second time adjustment information is the first delay, the RAN may indicate to the SMF whether the first delay is an advance or retardation. For example, if the first delay is determined based on a boundary of a third scheduling window, the first delay is the retardation; or if the first delay is determined based on a boundary of a sixth scheduling window, the first delay is the advance.

Optionally, the RAN may provide an additional indication for the SMF only when the first delay is the retardation. When there is no additional indication, the first delay is the advance.

Optionally, the RAN may alternatively provide both the first delay that is the advance and the first delay that is the retardation for the SMF to select.

The first delay may be a time range, and the second time adjustment information is determined based on the first delay. Therefore, the second time adjustment information may be a moment, or may be a time range. When the first delay is the time range, the second time adjustment information may be a time range determined by the RAN based on the first delay. Alternatively, the RAN may determine a time range based on the first delay, and then determine a moment within the time range as the second time adjustment information based on the time range. S1103: The RAN sends the second time adjustment information to the SMF.

For example, if the second time adjustment information is the first delay, the RAN may indicate to the SMF whether the second time adjustment information is an advance or retardation. For example, if the second time adjustment information is determined based on the boundary of the third scheduling window, the second time adjustment information is the retardation; or if the second time adjustment information is determined based on the boundary of the sixth scheduling window, the second time adjustment information is the advance.

Optionally, the RAN may provide an additional indication for the SMF only when the second time adjustment information is the retardation. When there is no additional indication, the second time adjustment information is the advance.

Optionally, the RAN may alternatively provide both the second time adjustment information that is the advance and the second time adjustment information that is the retardation for the SMF to select.

S1104 to S1107: The SMF sends the second time adjustment information to an AF, the AF determines, based on the second time adjustment information, a second moment at which an AS sends the downlink service packet, then the AF sends the second moment to the AS, and the AS may send the downlink service packet at the second moment.

Steps S1104 to S1107 are the same as steps S802 to S805. For details, refer to the foregoing descriptions of steps S802 to S805. Details are not described herein again.

Optionally, the method may further include S1108 and S1109. S1108 and S1109 are the same as S806 and S807. For details, refer to the foregoing descriptions of S806 and S807. Details are not described herein again.

According to the downlink transmission method provided in this application, the RAN may determine the time adjustment information based on the estimated moment at which the downlink service packet arrives at the RAN and the configuration information of the radio resource, and may provide the time adjustment information for the AF by using the SMF. The AF may adjust, based on the time adjustment information, the moment at which the AS sends the downlink service packet, so that the AS may send the downlink service packet at the adjusted moment. In this way, the moment at which the downlink service packet arrives at the RAN may be within a first scheduling window of the RAN, the downlink service packet may be scheduled in a second downlink scheduling window, and the second downlink scheduling window is a next scheduling window adjacent to the first scheduling window. This helps reduce a scheduling waiting delay of scheduling the downlink service by an access network element, and helps guarantee an end-to-end delay requirement of the downlink service packet.

Figure 12:
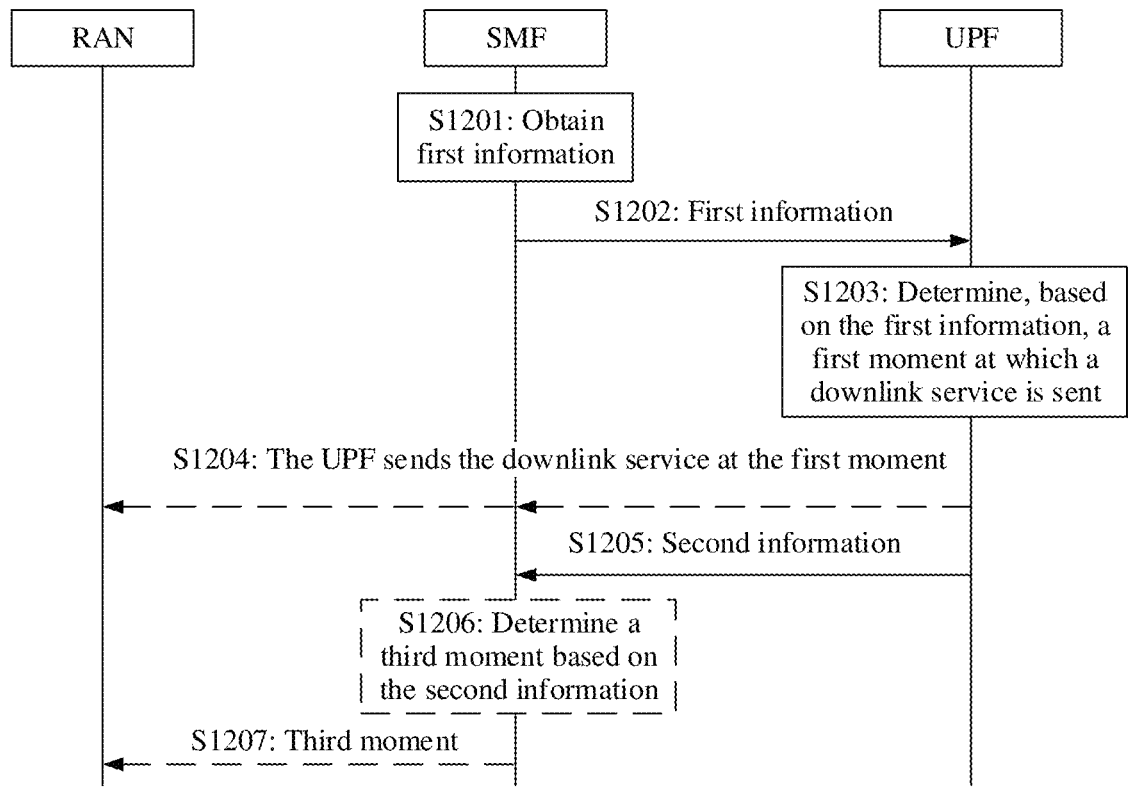
FIG. 12 is a schematic flowchart of a downlink transmission method according to this application.

FIG. 12 shows another downlink transmission method according to this application. The following describes the method 1200.

S1201: An SMF obtains first information, where the first information includes configuration information of a radio resource and an estimated moment at which a downlink service packet arrives at a RAN.

For specific content of the configuration information of the radio resource and how the SMF obtains the configuration information of the radio resource, refer to the descriptions in step S601. Details are not described herein again.

S1202: The SMF sends the first information to a UPF.

S1203: The UPF determines a first moment based on the first information.

A moment (denoted as a third moment) at which the downlink service packet sent by the UPF at the first moment arrives at the RAN is within a first scheduling window of the RAN, and a next scheduling window adjacent to the first scheduling window is a downlink scheduling window. In other words, the UPF is to send the downlink service packet at the first moment, so that the downlink service packet may be scheduled in a fourth downlink scheduling window after arriving at the RAN, and the fourth downlink scheduling window is the next scheduling window adjacent to the first scheduling window.

For example, the UPF may determine first time adjustment information based on the first information, and then determine the first moment based on the first time adjustment information.

A method for determining, by the UPF, the first time adjustment information based on the first information is the same as the method for determining, by the SMF, the first delay based on the configuration information of the radio resource and the estimated moment at which the downlink service packet arrives at the RAN in S601. For details, refer to the descriptions in S601. Details are not described herein again.

In addition, for how the UPF specifically determines the first moment based on the first time adjustment information, refer to the descriptions in S603. Details are not described herein again.

Optionally, the UPF may buffer a downlink packet of a first service based on the first time adjustment information after receiving the downlink packet of the first service, where buffer duration is duration indicated by the first time adjustment information.

S1204: The UPF sends the downlink service at the first moment.

According to the downlink transmission method provided in this application, the UPF may determine the sending moment of the downlink service packet based on the first information provided by the SMF, so that the moment at which the downlink service packet arrives at the RAN may be within the first scheduling window of the RAN, the downlink service packet may be scheduled in a second downlink scheduling window, and the second downlink scheduling window is the next scheduling window adjacent to the first scheduling window. This helps reduce a scheduling waiting delay of scheduling the downlink service by an access network element, and helps guarantee an end-to-end delay of the downlink service packet.

Optionally, the method may further include the following steps.

S1205: The UPF sends second information to the SMF. Accordingly, the SMF receives the second information from the UPF.

The second information is the first moment or a waiting or buffer delay of the downlink service on the UPF.

S1206: The SMF determines the third moment based on the second information.

S1207: The SMF sends the third moment to the RAN, where the third moment is used by the RAN to schedule a downlink service.

In S1206, for example, if the second information is the waiting or buffer delay of the downlink service on the UPF, the third moment may be a sum of a moment at which the downlink service packet arrives at the UPF, the second information, and a transmission delay from the UPF to the RAN. For example, if the second information is the first moment, the third moment may be a sum of the first moment and a transmission delay from the UPF to the RAN.

Step S1207 is the same as step S606. Refer to the descriptions in S606. Details are not described herein again.

It should be noted that, if the SMF obtains the second information in another manner, step S1206 and step S1207 are also applicable, and details are not described in this application.

It should be noted that, in this application, because the downlink service may be a periodic service, a moment at which the downlink service packet is sent or scheduled may be a start sending moment of the downlink service packet, and subsequently each network element periodically sends or schedules the downlink service packet based on the moment.

It should be understood that the solutions in embodiments of this application may be properly combined for use, and explanations or descriptions of terms in embodiments may be cross-referenced or explained in embodiments. This is not limited.

It should be further understood that sequence numbers of the foregoing processes do not mean execution sequences in embodiments of this application. The execution sequences of the processes should be determined based on functions and internal logic of the processes. Numbers or sequence numbers in the foregoing processes are merely for differentiation for ease of description, and should not constitute any limitation on an implementation process of embodiments of this application.

The methods provided in embodiments of this application are described above in detail with reference to FIG. 5 to FIG. 12. Apparatuses provided in embodiments of this application are described below in detail with reference to FIG. 13 to FIG. 15.

Figure 13:
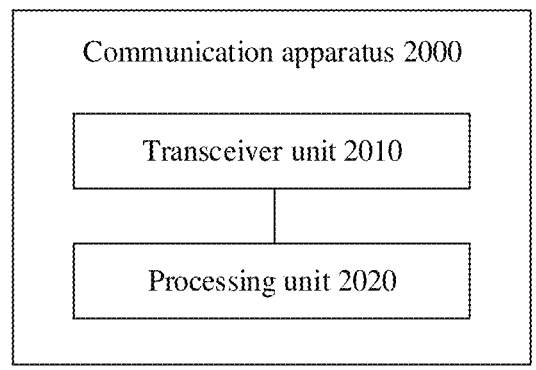
FIG. 13 is a schematic block diagram of a communication apparatus according to this application.

FIG. 13 is a schematic block diagram of a communication apparatus according to an embodiment of this application. As shown in FIG. 13, the communication apparatus 2000 may include a transceiver unit 2010 and a processing unit 2020.

The transceiver unit 2010 may be configured to send information to another apparatus or receive information from the another apparatus, for example, send or receive time adjustment information (for example, first time adjustment information). The processing unit 1200 may be configured to perform internal processing of the apparatus, for example, obtain a first delay.

In an implementation, the communication apparatus 2000 corresponds to the session management network element (for example, the SMF) in the foregoing methods. The communication apparatus 2000 may be a session management network element or a chip configured in the session management network element, and may include a unit configured to perform an operation performed by the session management network element.

In an example, the communication apparatus 2000 corresponds to the session management network element in the method 600 or 800.

The processing unit 2020 is configured to obtain a first delay, where the first delay is duration between an expected moment at which a downlink service packet arrives at an access network element and an estimated moment at which the downlink service packet arrives at the access network element, the expected moment at which the downlink service packet arrives at the access network element is within a first scheduling window, and a next scheduling window adjacent to the first scheduling window is a downlink scheduling window. The transceiver unit 2010 is configured to send time adjustment information related to the first delay to a first network element, where the first network element is a user plane network element or an application network element, the time adjustment information is for determining a first moment at which the user plane network element sends the downlink service packet, or is used by an application server to determine a second moment at which the downlink service packet is sent, and a third moment at which the downlink service packet sent by the user plane network element at the first moment or sent by the application server at the second moment arrives at the access network element is within the first scheduling window.

Optionally, the processing unit 2020 is specifically configured to obtain configuration information of a radio resource of the access network element and the estimated moment at which the downlink service packet arrives at the access network element; and determine the first delay based on the configuration information of the radio resource and the estimated moment at which the downlink service packet arrives at the access network element.

Optionally, the processing unit 2020 is specifically configured to: determine, based on the configuration information of the radio resource and the estimated moment at which the downlink service packet arrives at the access network element, an estimated second downlink scheduling window for the access network element to schedule the downlink service packet; determine a boundary of a third scheduling window based on the configuration information of the radio resource and the second downlink scheduling window, where the third scheduling window is a scheduling window previous to the second downlink scheduling window; and determine the first delay based on the boundary of the third scheduling window.

Optionally, the configuration information of the radio resource includes a slot start moment, slot duration, an uplink-downlink slot configuration, and a scheduling processing delay of the access network element.

Optionally, the processing unit 2020 is specifically configured to obtain the estimated moment at which the downlink service packet arrives at the access network element. The transceiver unit 2010 is further configured to send the estimated moment at which the downlink service packet arrives at the access network element to the access network element; and receive the first delay from the access network element.

Optionally, the processing unit 2020 is specifically configured to: determine, based on a transmission delay from the user plane network element to the access network element and an estimated moment at which the downlink service packet arrives at the user plane network element, the estimated moment at which the downlink service packet arrives at the access network element; or obtain quality of service QoS information of the downlink service from a policy control network element, and determine, based on the QoS information, the estimated moment at which the downlink service packet arrives at the access network element.

Optionally, when the first network element is the user plane network element, the time adjustment information is the first delay or a fourth moment determined based on the first delay and the estimated moment at which the downlink service packet arrives at the user plane network element.

Optionally, when the first network element is the application network element, the time adjustment information includes one or more of the following: the first delay, an expected moment that is determined based on the first delay and at which the downlink service packet arrives at the user plane network element, and an expected moment that is determined based on the first delay and at which the downlink service packet arrives at a terminal device.

Optionally, the processing unit 2020 is further configured to determine the third moment based on the time adjustment information. The transceiver unit 2010 is further configured to send the third moment to the access network element, where the third moment is used by the access network element to schedule the downlink service packet.

In another example, the communication apparatus 2000 corresponds to the session management network element in the method 1200.

Specifically, the processing unit 2020 is configured to obtain first information, where the first information includes configuration information of a radio resource and an estimated moment at which a downlink service packet arrives at an access network element. The transceiver unit 2010 is configured to send the first information to a user plane network element, where the first information is for determining a first moment at which the user plane network element sends the downlink service packet, a third moment at which the downlink service packet sent at the first moment arrives at the access network element is within a first scheduling window of the access network element, and a next scheduling window adjacent to the first scheduling window is a downlink scheduling window.

Optionally, the configuration information of the radio resource includes a slot start moment, slot duration, an uplink-downlink slot configuration, and a scheduling processing delay of the access network element.

Optionally, the transceiver unit 2010 is further configured to receive second information from the user plane network element, where the second information is the first moment or a waiting delay of the downlink service packet on the user plane network element. The processing unit 2020 is further configured to determine the third moment based on the second information. The transceiver unit 2010 is further configured to send the third moment to the access network element.

It should be understood that the communication apparatus 2000 may further correspond to the session management network element in the methods 1000 and 1100. For specific operations performed by the communication apparatus 2000, refer to the descriptions of the session management network element in the methods 1000 and 1100. Details are not described herein again.

In an implementation, the communication apparatus 2000 corresponds to the user plane network element (for example, the UPF) in the foregoing methods. The communication apparatus 2000 may be a user plane network element or a chip configured in the user plane network element, and may include a unit configured to perform an operation performed by the user plane network element.

In an example, the communication apparatus 2000 corresponds to the user plane network element in the method 600 or 800.

Specifically, the transceiver unit 2010 is configured to receive, from a session management network element, time adjustment information related to a first delay, where the first delay is duration between an expected moment at which a downlink service packet arrives at an access network element and an estimated moment at which the downlink service packet arrives at the access network element, the expected moment at which the downlink service packet arrives at the access network element is within a first scheduling window, and a next scheduling window adjacent to the first scheduling window is a downlink scheduling window. The processing unit 2020 is configured to determine, based on the time adjustment information, a first moment at which the communication apparatus 2000 sends the downlink service packet, where a third moment at which the downlink service packet sent at the first moment arrives at the access network element is within the first scheduling window.

Optionally, the time adjustment information is the first delay or a fourth moment determined based on the first delay and an estimated moment at which the downlink service packet arrives at the communication apparatus 2000.

In an example, the communication apparatus 2000 corresponds to the user plane network element in the method 1200.

Specifically, the transceiver unit 2010 is configured to receive first information from a session management network element, where the first information includes configuration information of a radio resource and an estimated moment at which a downlink service packet arrives at an access network element. The processing unit 2020 is configured to determine, based on the first information, a first moment at which the downlink service packet is sent, where a third moment at which the downlink service packet sent at the first moment arrives at the access network element is within a first scheduling window of the access network element, and a next scheduling window adjacent to the first scheduling window is a downlink scheduling window.

Optionally, the configuration information of the radio resource includes a slot start moment, slot duration, an uplink-downlink slot configuration, and a scheduling processing delay of the access network element.

Optionally, the processing unit 2020 is specifically configured to: determine a first delay based on the first information, where the first delay is duration between an expected moment at which the downlink service packet arrives at the access network element and the estimated moment at which the downlink service packet arrives at the access network element; and determine the first moment based on the first delay.

Optionally, the transceiver unit 2010 is further configured to send second information to the session management network element, where the second information is the first moment or a waiting delay of the downlink service on the communication apparatus 2000, and the second information is for determining the third moment.

It should be understood that the communication apparatus 2000 may further correspond to the user plane network element in the methods 1000 and 1100. For specific operations performed by the communication apparatus 2000, refer to the description of the user plane network element in the methods 1000 and 1100. Details are not described herein again.

In an implementation, the communication apparatus 2000 corresponds to the application network element (for example, the AF) in the foregoing methods. The communication apparatus 2000 may be an application network element or a chip configured in the application network element, and may include a unit configured to perform an operation performed by the application network element.

In an example, the communication apparatus 2000 corresponds to the application network element in the method 800.

Specifically, the transceiver unit 2010 is configured to receive, from a session management network element, time adjustment information related to a first delay, where the first delay is duration between an expected moment at which a downlink service packet arrives at an access network element and an estimated moment at which the downlink service packet arrives at the access network element, the expected moment at which the downlink service packet arrives at the access network element is within a first scheduling window, and a next scheduling window adjacent to the first scheduling window is a downlink scheduling window. The processing unit 2020 is configured to determine, based on the time adjustment information, a second moment at which an application server sends the downlink service packet, where a third moment at which the downlink service packet sent at the second moment arrives at the access network element is within the first scheduling window.

Optionally, the time adjustment information includes one or more of the following: the first delay, an expected moment that is determined based on the first delay and at which the downlink service packet arrives at a user plane network element, and an expected moment that is determined based on the first delay and at which the downlink service packet arrives at a terminal device.

It should be understood that the communication apparatus 2000 may further correspond to the application network element in the method 1100. For specific operations performed by the communication apparatus 2000, refer to the descriptions of the application network element in the method 1100. Details are not described herein again.

In an implementation, the communication apparatus 2000 corresponds to the access network element (for example, the RAN) in the foregoing methods. The communication apparatus 2000 may be an access network element or a chip configured in the access network element, and may include a unit configured to perform an operation performed by the access network element.

In an example, the communication apparatus 2000 corresponds to the access network element in the method 600 or 800.

Specifically, the transceiver unit 2010 is configured to receive, from a session management network element, an estimated moment at which a downlink service packet arrives at the communication apparatus 2000. The processing unit 2020 is configured to determine a first delay based on the estimated moment at which the downlink service packet arrives at the communication apparatus 2000, where the first delay is duration between an moment that is expected by the communication apparatus 2000 and at which the downlink service packet arrives at the communication apparatus 2000 and the estimated moment at which the downlink service packet arrives at the communication apparatus 2000, the moment that is expected by the communication apparatus 2000 and at which the downlink service packet arrives at the communication apparatus 2000 is within a first scheduling window, and a next scheduling window adjacent to the first scheduling window is a downlink scheduling window. The transceiver unit 2010 is further configured to send the first delay to the session management network element, where the first delay is used by the session management network element to adjust a moment at which a user plane network element sends the downlink service packet and/or a moment at which an application server sends the downlink service packet.

Optionally, the processing unit 2020 is specifically configured to determine the first delay based on the estimated moment at which the downlink service packet arrives at the communication apparatus 2000 and configuration information of a radio resource of the communication apparatus 2000.

Optionally, the configuration information of the radio resource includes a slot start moment, slot duration, an uplink-downlink slot configuration, and a scheduling processing delay of the communication apparatus 2000.

Optionally, the processing unit 2020 is specifically configured to: determine, based on the configuration information of the radio resource and the estimated moment at which the downlink service packet arrives at the communication apparatus 2000, an estimated second downlink scheduling window for the communication apparatus 2000 to schedule the downlink service; determine a boundary of a third scheduling window based on the configuration information of the radio resource and the second downlink scheduling window, where the third scheduling window is a scheduling window previous to the second downlink scheduling window; and determine the first delay based on the boundary of the third scheduling window.

In an example, the communication apparatus 2000 corresponds to the access network element in the method 1000 or 1100.

Specifically, the transceiver unit 2010 is configured to receive, from a session management network element, an estimated moment at which a downlink service packet arrives at the communication apparatus 2000. The processing unit 2020 is configured to determine time adjustment information based on the estimated moment at which the downlink service packet arrives at the communication apparatus 2000 and configuration information of a radio resource. The transceiver unit 2010 is further configured to send the time adjustment information to the session management network element, where the time adjustment information is used by the session management network element to adjust a moment at which a user plane network element sends the downlink service packet and/or a moment at which an application server sends the downlink service packet.

Optionally, the processing unit 2020 is specifically configured to: determine a first delay based on the estimated moment at which the downlink service packet arrives at the communication apparatus 2000 and the configuration information of the radio resource, where the first delay is duration between a moment that is expected by the communication apparatus 2000 and at which the downlink service packet arrives at the communication apparatus 2000 and the estimated moment at which the downlink service packet arrives at the communication apparatus 2000, the moment that is expected by the communication apparatus 2000 and at which the downlink service packet arrives at the communication apparatus 2000 is within a first scheduling window, and a next scheduling window adjacent to the first scheduling window is a downlink scheduling window; and determine the time adjustment information based on the first delay.

Optionally, the processing unit 2020 is specifically configured to: determine, based on the estimated moment at which the downlink service packet arrives at the communication apparatus 2000 and the configuration information of the radio resource, an estimated second downlink scheduling window for the communication apparatus 2000 to schedule the downlink service packet; determine a boundary of a third scheduling window based on the second downlink scheduling window, where the third scheduling window is a scheduling window previous to the second downlink scheduling window; and determine the time adjustment information based on the boundary of the third scheduling window.

Optionally, the configuration information of the radio resource includes a slot start moment, slot duration, an uplink-downlink slot configuration, and a scheduling processing delay of the communication apparatus 2000.

It should be understood that the communication apparatus 2000 may further correspond to the access network element in the method 1200. For specific operations performed by the communication apparatus 2000, refer to the descriptions of the access network element in the method 1200. Details are not described herein again.

It should be understood that a specific process in which the units perform the foregoing corresponding steps has been described in detail in the foregoing method embodiments. For brevity, details are not described herein again.

Figure 14:
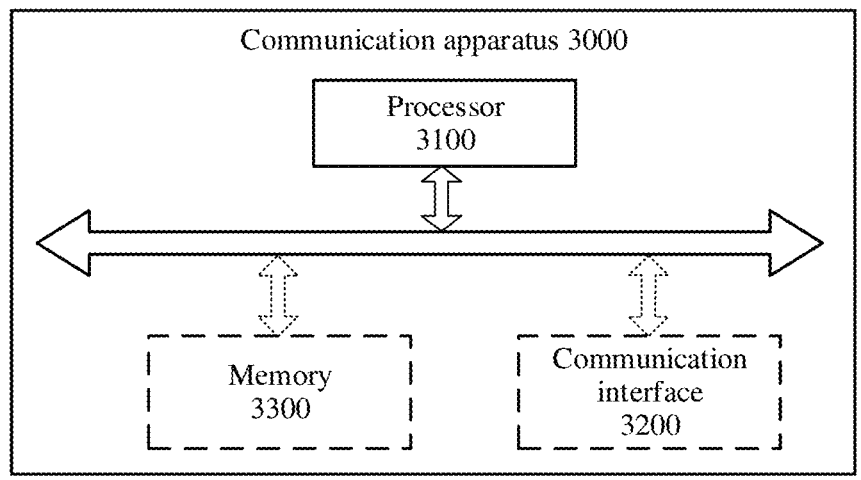
FIG. 14 is a schematic block diagram of another communication apparatus according to this application.

It should be further understood that when the communication apparatus 2000 corresponds to the session management network element, the application network element, the user plane network element, or the access network element, the transceiver unit 2010 in the communication apparatus 2000 may correspond to a communication interface 3200 in a communication apparatus 3000 shown in FIG. 14, and the processing unit 2020 in the communication apparatus 2000 may correspond to a processor 3100 in the communication apparatus 3000 shown in FIG. 14. When the communication apparatus 2000 corresponds to the access network element, the transceiver unit 2010 in the communication apparatus 2000 may further correspond to a transceiver 4200 in a network device 4000 shown in FIG. 15, and the processing unit 2020 in the communication apparatus 2000 may further correspond to a processor 4100 in the network device 4000 shown in FIG. 15.

FIG. 14 is a schematic block diagram of another communication apparatus 3000 according to this application. Any network element, for example, the session management network element, the application network element, the user plane network element, or the access network element, in the foregoing method embodiments, may be implemented by the communication apparatus shown in FIG. 14.

It should be understood that the communication apparatus 3000 may be a physical device, a component (for example, an integrated circuit or a chip) of the physical device, or may be a function module in the physical device.

As shown in FIG. 14, the communication apparatus 3000 includes one or more processors 3100. The processor 3100 may store execution instructions for performing the method in embodiments of this application. Optionally, the processor 3100 may invoke a communication interface 3200 to implement receiving and sending functions. The communication interface 3200 may be a logical interface or a physical interface. This is not limited. For example, the communication interface 3200 may be a transceiver circuit, an interface circuit, a transceiver, or a transceiver circuit configured to implement the receiving and sending functions. The sending function and the receiving function of the communication interface 3200 may be separated, or may be integrated. The transceiver circuit or the interface circuit may be configured to read and write code/data, or the transceiver circuit or the interface circuit may be configured to transmit or transfer a signal.

Optionally, the communication apparatus 3000 may further include a memory 3300. A specific deployment location of the memory 3300 is not specifically limited in this embodiment of this application. The memory 3300 may be integrated into the processor 3100, or may be independent of the processor 3100. When the communication apparatus 3000 does not include a memory, the communication apparatus 3000 only needs to have a processing function, and the memory may be deployed at another location (for example, a cloud system).

The processor 3100, the memory 3300, and the communication interface 3200 communicate with each other through an internal connection path, to transfer a control signal and/or a data signal.

It may be understood that, although not shown, the communication apparatus 3000 may further include another apparatus, for example, an input apparatus, an output apparatus, or a battery.

Optionally, in some embodiments, the memory 3300 may store the execution instructions for performing the method in embodiments of this application. The processor 3100 may execute the instructions stored in the memory 3300 and complete, in combination with other hardware (for example, the communication interface 3200), steps performed in the following method. For a specific working process and beneficial effects, refer to the descriptions in the foregoing method embodiments.

The method disclosed in embodiments of this application may be applied to the memory 3300, or may be implemented by the memory 3300. The memory 3300 may be an integrated circuit chip with a signal processing capability. In an implementation process, the steps of the method may be performed through a hardware integrated logic circuit in the processor or by using instructions in a form of software. The foregoing processor may be a general-purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware in a decoding processor and a software module. The software module may be located in a mature storage medium in the art, such as a random access memory (RAM), a flash memory, a read-only memory (ROM), a programmable read-only memory, an electrically erasable programmable memory, or a register. The storage medium is located in the memory, and the processor reads the instructions in the memory, and completes the steps in the foregoing methods in combination with hardware of the processor.

It may be understood that the memory 3300 may be a volatile memory or a nonvolatile memory, or may include both a volatile memory and a nonvolatile memory. The non-volatile memory may be a read-only memory ROM, a programmable read-only memory (PROM), an erasable programmable read-only memory (erasable PROM, EPROM), an electrically erasable programmable read-only memory (electrically EPROM, EEPROM), or a flash memory. The volatile memory may be a random access memory RAM, and serves as an external cache. By way of example but not limitative description, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and method described in this specification aims to include, but not limited to, these and any memory of another proper type.

Figure 15:
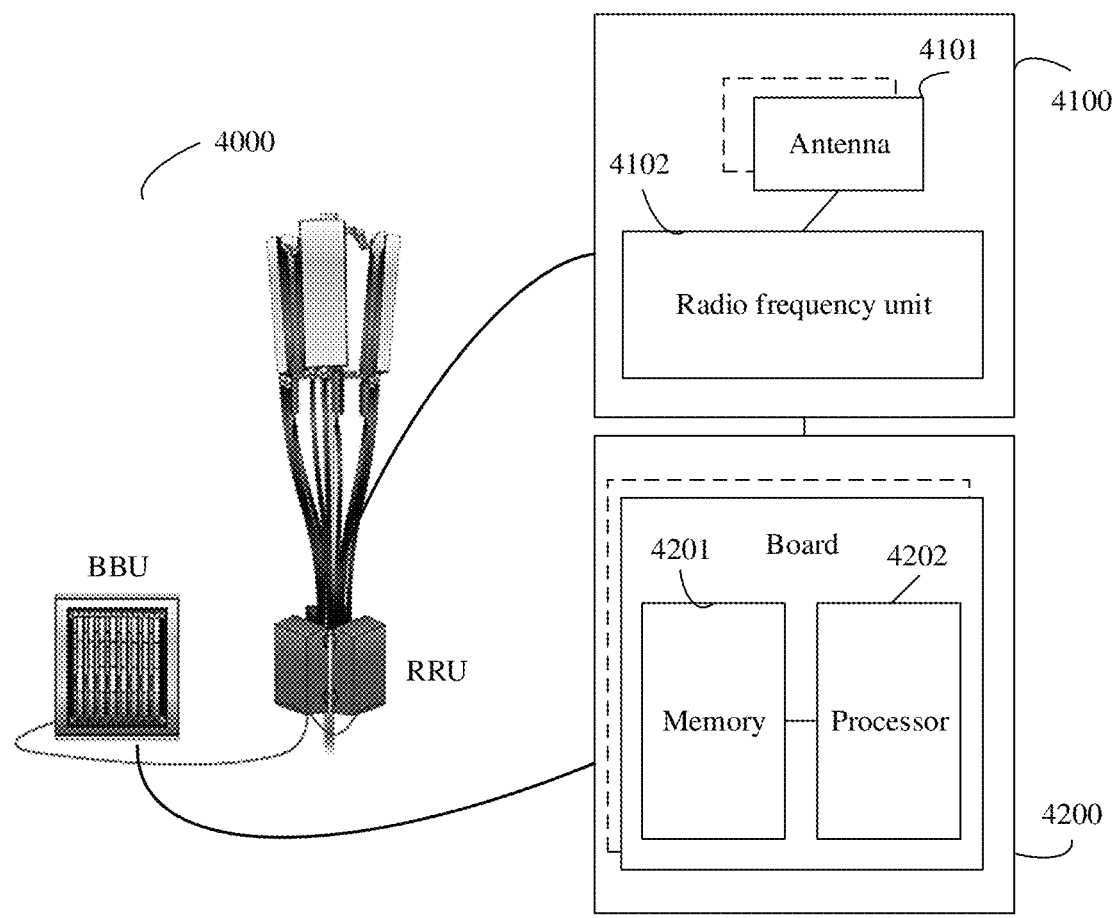
FIG. 15 is a schematic diagram of a structure of a network device according to this application.

FIG. 15 is a schematic diagram of a structure of a network device according to an embodiment of this application. For example, FIG. 15 may be a schematic diagram of a structure of a base station. The network device 4000 may be used in the system shown in FIG. 1 or FIG. 2, and perform a function of the access network element in the foregoing method embodiments. As shown in FIG. 15, the network device 4000 may include one or more radio frequency units such as remote radio units (RRUs) 4100 and one or more baseband units (BBUs) (which may also be referred to as distributed units (DUs)) 4200. The RRU 4100 may be referred to as a transceiver unit or a communication unit, and corresponds to the transceiver unit 2010 in FIG. 13. Optionally, the transceiver unit 4100 may also be referred to as a transceiver, a transceiver circuit, or the like, and may include at least one antenna 4101 and a radio frequency unit 4102. Optionally, the transceiver unit 4100 may include a receiving unit and a sending unit. The receiving unit may correspond to a receiver (or referred to as a receiver circuit), and the sending unit may correspond to a transmitter (or referred to as a transmitter circuit). The RRU 4100 is mainly configured to send and receive radio frequency signals and perform conversion between a radio frequency signal and a baseband signal. The BBU 4200 is mainly configured to perform baseband processing, control the network device, and so on. The RRU 4100 and the BBU 4200 may be physically disposed together, or may be physically disposed separately, namely, a distributed base station.

The BBU 4200 is a control center of the network device, may also be referred to as a processing unit, may correspond to the processing unit 2020 in FIG. 13, and is mainly configured to implement a baseband processing function, for example, channel coding, multiplexing, modulation, or spreading. For example, the BBU (the processing unit) may be configured to control the network device to perform operation procedures related to the access network device in the foregoing method embodiments.

In an example, the BBU 4200 may include one or more boards, and a plurality of boards may jointly support a radio access network (for example, an LTE network) having a single access standard, or may separately support radio access networks (for example, the LTE network, a 5G network, or another network) having different access standards. The BBU 4200 further includes a memory 4201 and a processor 4202. The memory 4201 is configured to store necessary instructions and data. The processor 4202 is configured to control the network device to perform a necessary action, for example, is configured to control the network device to perform the operation procedures related to the access network device in the foregoing method embodiments. The memory 4201 and the processor 4202 may serve one or more boards. In other words, the memory and the processor may be separately disposed on each board. Alternatively, a plurality of boards may share a same memory and a same processor. In addition, a necessary circuit may further be disposed on each board.

It should be understood that the network device 4000 shown in FIG. 15 can implement processes related to the access network device in the foregoing method embodiments. Operations or functions of the modules in the network device 4000 are respectively intended to implement corresponding procedures in the foregoing method embodiments. For details, refer to the descriptions in the foregoing method embodiments. To avoid repetition, detailed descriptions are appropriately omitted herein.

The BBU 4200 may be configured to perform an action implemented inside the access network device in the foregoing method embodiments, and the RRU 4100 may be configured to perform an action of sending by the access network device to the terminal device or receiving from the terminal device in the foregoing method embodiments. For details, refer to the descriptions in the foregoing method embodiments. Details are not described herein again.

This application further provides a computer program product. The computer program product includes computer program code. When the computer program code is run on a computer, the computer is enabled to perform the method on the session management network element side, the application network element side, the user plane network element side, or the access network element side in any one of the foregoing method embodiments.

This application further provides a computer-readable medium. The computer-readable medium stores program code. When the program code is run on a computer, the computer is enabled to perform the method on the session management network element side, the application network element side, the user plane network element side, or the access network element side in the foregoing method embodiments.

This application further provides a system, including one or more of the foregoing session management network element, application network element, user plane network element, and access network element. Optionally, the system may further include the foregoing terminal device.

An embodiment of this application further provides a processing apparatus, including a processor and an interface. The processor is configured to perform the communication method in any one of the foregoing method embodiments.

It should be understood that the processing apparatus may be a chip. For example, the processing apparatus may be a FPGA, may be a general-purpose processor, a DSP, an ASIC, the FPGA, another programmable logic device, a discrete gate, a transistor logic device, or a discrete hardware component, may be a system on chip (SoC), may be a CPU, may be a network processor (NP), may be a DSP, may be a micro controller unit (MCU), or may be a programmable logic device (PLD) or another integrated chip. The processing apparatus may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory, and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a ROM, a PROM, an EPROM, an EEPROM, or a flash memory. The volatile memory may be a RAM that is used as an external cache. By way of example but not limitative description, many forms of RAMs are available, for example, a SRAM, a DRAM, a DRAM, a DDR SDRAM, an ESDRAM, a SLDRAM, and a DR RAM. It should be noted that the memory in the system and method described in this specification aims to include, but not limited to, these and any memory of another proper type.

All or some of the foregoing embodiments may be implemented by using software, hardware, firmware, or any combination thereof. When software is for implementing embodiments, all or some of embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, a solid state disc (SSD)), or the like.

The network device and the terminal device in the foregoing apparatus embodiments exactly correspond to the network device and the terminal device in the method embodiments. A corresponding module or unit performs a corresponding step. For example, a communication unit (a transceiver) performs a receiving step or a sending step in the method embodiments, and a processing unit (a processor) may perform a step other than the sending step and the receiving step. For a function of a specific unit, refer to a corresponding method embodiment. There may be one or more processors.

Terms such as "component", "module", and "system" used in this specification indicate computer-related entities, hardware, firmware, combinations of hardware and software, software, or software being executed. For example, a component may be but is not limited to a process that runs on a processor, a processor, an object, an executable file, an execution thread, a program, or a computer. As illustrated by using figures, both a computing device and an application that runs on the computing device may be components. One or more components may reside within a process or an execution thread, and a component may be located on one computer or distributed between two or more computers. In addition, these components may be executed by various computer-readable media that store various data structures. For example, the components may communicate by using a local or remote process based on a signal having one or more data packets (for example, data from two components interacting with another component in a local system, in a distributed system, or across a network such as the Internet interacting with another system by using the signal).

It should be understood that, an "embodiment" mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments in any proper manner.

It should be understood that, in embodiments of this application, numbers "first", "second", and the like are merely for distinguishing between different objects, for example, to distinguish between different network devices, and do not constitute a limitation on the scope of embodiments of this application. Embodiments of this application are not limited thereto.

It should be further understood that, in this application, both "when" and "if" mean that a network element performs corresponding processing in an objective situation, but do not constitute a limitation on time, do not require that the network element has a determining action during implementation, and do not mean other limitations either.

It should be further understood that, in this application, "at least one" means one or more, and "a plurality of" means two or more.

It should be further understood that, in embodiments of this application, "B corresponding to A" indicates that B is associated with A, and B may be determined based on A. However, it should be further understood that determining B based on A does not mean that B is determined based on only A, that is, B may also be determined based on A and/or other information.

It should also be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between associated objects.

Unless otherwise specified, an expression used in this application similar to an expression that "an item includes one or more of the following: A, B, and C" usually means that the item may be any one of the following: A; B; C; A and B; A and C; B and C; A, B, and C; A and A; A, A, and A; A, A, and B; A, A, and C; A, B, and B; A, C, and C; B and B; B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It may be understood that, in embodiments of this application, the terminal device and/or the network device may perform some or all steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application may be performed.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each unit may exist alone physically, or two or more units may be integrated into one unit.

When the functions are implemented in the form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    obtaining, by a session management network element, a first delay, wherein the first delay is a duration between an expected moment at which a downlink service packet arrives at an access network element and an estimated moment at which the downlink service packet arrives at the access network element, the expected moment at which the downlink service packet arrives at the access network element is within a first scheduling window, and a next scheduling window adjacent to the first scheduling window is a downlink scheduling window; and
    sending, by the session management network element, time adjustment information related to the first delay to a first network element, wherein the first network element is an application network element, the time adjustment information is used by the application network element to determine a second moment at which the downlink service packet is sent, and a third moment at which the downlink service packet sent at the second moment arrives at the access network element is within the first scheduling window.

2. The method according to claim 1, wherein obtaining, by the session management network element, the first delay comprises:
    obtaining, by the session management network element, configuration information of a radio resource of the access network element and the estimated moment at which the downlink service packet arrives at the access network element; and
    determining, by the session management network element, the first delay based on the configuration information of the radio resource and the estimated moment at which the downlink service packet arrives at the access network element.

3. The method according to claim 2, wherein determining, by the session management network element, the first delay based on the configuration information of the radio resource and the estimated moment at which the downlink service packet arrives at the access network element comprises:
    determining, by the session management network element based on the configuration information of the radio resource and the estimated moment at which the downlink service packet arrives at the access network element, an estimated second downlink scheduling window in which the access network element will schedule the downlink service packet;
    determining, by the session management network element, a boundary of a third scheduling window based on the configuration information of the radio resource and the estimated second downlink scheduling window, wherein the third scheduling window is prior to the estimated second downlink scheduling window; and
    determining, by the session management network element, the first delay based on the boundary of the third scheduling window.

4. The method according to claim 2, wherein the configuration information of the radio resource comprises a slot start moment, a slot duration, an uplink-downlink slot configuration, and a scheduling processing delay of the access network element.

5. The method according to claim 1, wherein obtaining, by the session management network element, the first delay comprises:
    obtaining, by the session management network element, the estimated moment at which the downlink service packet arrives at the access network element;
    sending, by the session management network element, the estimated moment at which the downlink service packet arrives at the access network element to the access network element; and receiving, by the session management network element, the first delay from the access network element.

6. The method according to claim 5, wherein obtaining, by the session management network element, the estimated moment at which the downlink service packet arrives at the access network element comprises:

determining, by the session management network element based on a transmission delay from a user plane network element to the access network element and an estimated moment at which the downlink service packet arrives at the user plane network element, the estimated moment at which the downlink service packet arrives at the access network element.

7. The method according to claim 1, wherein the time adjustment information comprises the first delay.

8. The method according to claim 1, further comprising:

determining, by the session management network element, the third moment based on the time adjustment information; and sending, by the session management network element, the third moment to the access network element, wherein the third moment is used by the access network element to schedule the downlink service packet.

9. The method according to claim 1, wherein the time adjustment information indicates a time range.

10. The method according to claim 1, wherein the time adjustment information indicates a specific moment.

11. A method, comprising:

receiving, by an application network element from a session management network element, time adjustment information related to a first delay, wherein the first delay is a duration between an expected moment at which a downlink service packet arrives at an access network element and an estimated moment at which the downlink service packet arrives at the access network element, the expected moment at which the downlink service packet arrives at the access network element is within a first scheduling window, and a next scheduling window adjacent to the first scheduling window is a downlink scheduling window; and determining, by the application network element based on the time adjustment information, a second moment at which the downlink service packet is sent, wherein a third moment at which the downlink service packet sent at the second moment arrives at the access network element is within the first scheduling window.

12. The method according to claim 11, wherein the time adjustment information comprises one or more of the following: the first delay, an expected moment that is determined based on the first delay and at which the downlink service packet arrives at a user plane network element, or an expected moment that is determined based on the first delay and at which the downlink service packet arrives at a terminal device.

13. The method according to claim 11, wherein the time adjustment information indicates a time range.

14. A method, comprising:

receiving, by an access network element from a session management network element, an estimated moment at which a downlink service packet arrives at the access network element;

determining, by the access network element, a first delay based on the estimated moment at which the downlink service packet arrives at the access network element, wherein the first delay is a duration between an expected moment at which the downlink service packet arrives at the access network element and the estimated moment at which the downlink service packet arrives at the access network element, the expected moment at which the downlink service packet arrives at the access network element is within a first scheduling window, and a next scheduling window adjacent to the first scheduling window is a downlink scheduling window; and sending, by the access network element, the first delay to the session management network element, wherein the first delay is used to adjust a second moment at which the downlink service packet is sent, and a third moment at which the downlink service packet sent at the second moment arrives at the access network element is within the first scheduling window.

15. The method according to claim 14, wherein determining, by the access network element, the first delay based on the estimated moment at which the downlink service packet arrives at the access network element comprises:

determining, by the access network element, the first delay based on the estimated moment at which the downlink service packet arrives at the access network element and configuration information of a radio resource of the access network element.

16. The method according to claim 15, wherein the configuration information of the radio resource comprises a slot start moment, slot duration, an uplink-downlink slot configuration, and a scheduling processing delay of the access network element.

17. The method according to claim 15, wherein determining, by the access network element, the first delay based on the estimated moment at which the downlink service packet arrives at the access network element and the configuration information of the radio resource of the access network element comprises:

determining, by the access network element based on the configuration information of the radio resource and the estimated moment at which the downlink service packet arrives at the access network element, an estimated second downlink scheduling window in which the access network element schedules the downlink service packet;

determining, by the access network element, a boundary of a third scheduling window based on the configuration information of the radio resource and the estimated second downlink scheduling window, wherein the third scheduling window is previous to the estimated second downlink scheduling window; and determining, by the access network element, the first delay based on the boundary of the third scheduling window.

* * * * *